(12) United States Patent
Hall et al.

(10) Patent No.: US 7,453,768 B2
(45) Date of Patent: Nov. 18, 2008

(54) HIGH-SPEED, DOWNHOLE, CROSS WELL MEASUREMENT SYSTEM

(76) Inventors: David R. Hall, 2185 S. Larsen Pkwy., Provo, UT (US) 84606; Joe Fox, 2185 S. Larsen Pkwy., Provo, UT (US) 84606; Christopher Durrand, 2185 S. Larsen Pkwy., Provo, UT (US) 84606

( * ) Notice: Subject to any disclaimer, the term of this patent is extended or adjusted under 35 U.S.C. 154(b) by 107 days.

(21) Appl. No.: 11/382,324

(22) Filed: May 9, 2006

(65) Prior Publication Data

US 2006/0221768 A1    Oct. 5, 2006

Related U.S. Application Data

(63) Continuation-in-part of application No. 10/931,864, filed on Sep. 1, 2004, now abandoned.

(51) Int. Cl.
*E21B 47/12* (2006.01)
(52) U.S. Cl. .............................. 367/82; 367/25; 367/81; 340/853.1; 340/853.3; 340/853.7; 340/856.3
(58) Field of Classification Search ... 340/853.1–853.7, 340/856.1; 367/81–83, 25
See application file for complete search history.

(56) References Cited

U.S. PATENT DOCUMENTS

| | | | |
|---|---|---|---|
| 3,205,477 A | | 9/1965 | Kalbfell |
| 4,293,936 A | | 10/1981 | Cox |
| 4,298,970 A | * | 11/1981 | Shawhan et al. ............... 367/82 |
| 4,578,675 A | * | 3/1986 | MacLeod .................. 340/853.7 |
| 4,839,644 A | * | 6/1989 | Safinya et al. ............ 340/854.3 |
| 4,901,289 A | * | 2/1990 | Cretin et al. ................... 367/34 |
| 5,062,084 A | * | 10/1991 | Schoepf et al. .......... 340/853.9 |
| 5,113,379 A | | 5/1992 | Scherbatskoy |
| 5,157,392 A | * | 10/1992 | Zimmer ................... 340/853.9 |
| 5,191,557 A | | 3/1993 | Rector |
| 5,331,318 A | * | 7/1994 | Montgomery ............ 340/855.4 |
| 5,419,405 A | | 5/1995 | Patton |
| 5,511,038 A | | 4/1996 | Angeleri |
| 5,774,418 A | | 6/1998 | Magendie |
| 6,094,401 A | | 7/2000 | Masak |
| 6,131,658 A | | 10/2000 | Minear |
| 6,208,586 B1 | * | 3/2001 | Rorden et al. .................. 367/35 |
| 6,269,310 B1 | | 7/2001 | Washbourne |
| 6,281,489 B1 | * | 8/2001 | Tubel et al. ............. 250/227.14 |
| 6,369,718 B1 | | 4/2002 | Mathieu |
| 6,580,751 B1 | * | 6/2003 | Gardner et al. ............... 375/222 |

(Continued)

*Primary Examiner*—Jack W Keith
*Assistant Examiner*—Scott A Hughes
(74) *Attorney, Agent, or Firm*—Tyson J. Wilde

(57) ABSTRACT

In one aspect of the invention, a high-speed measurement system has a first and a second well bore. A first and second plurality of network nodes is integrated into and spaced at intervals along the first and second well bore, respectively. A communications channel connects each plurality of network nodes forming a first and second downhole network. A signal source is in communication with the first downhole network and a signal receiver is in communication with the second downhole network; and a common clock source is in communication with both the signal source and the signal receiver over the first and second downhole networks, respectively. The signal source and signal receiver are synchronized with the clock source and the signal source is adapted to send a signal to the signal receiver through a subterranean formation.

11 Claims, 17 Drawing Sheets

U.S. PATENT DOCUMENTS

| | | |
|---|---|---|
| 6,614,360 B1 | 9/2003 | Leggett |
| 6,868,037 B2 | 3/2005 | Dasgupta |
| 2002/0066309 A1 | 6/2002 | Tubel |
| 2002/0075114 A1 | 6/2002 | Hall |
| 2002/0126021 A1 | 9/2002 | Vinegar |
| 2002/0149501 A1 | 10/2002 | Beique |
| 2002/0195247 A1 | 12/2002 | Ciglenec |
| 2003/0014190 A1 | 1/2003 | Dubinsky |
| 2003/0142586 A1 | 7/2003 | Shah |
| 2003/0168213 A1* | 9/2003 | Harmon et al. ........ 166/250.01 |
| 2004/0112594 A1 | 6/2004 | Aronstam |
| 2004/0124994 A1 | 7/2004 | Oppelt |
| 2005/0034917 A1 | 2/2005 | Mathiszik |
| 2005/0035874 A1 | 2/2005 | Hall |
| 2005/0035875 A1 | 2/2005 | Hall |
| 2005/0104743 A1 | 5/2005 | Ripolone |
| 2005/0140374 A1 | 6/2005 | Itskovich |
| 2005/0149266 A1 | 7/2005 | Mathiszik |

* cited by examiner

HIGH-SPEED, DOWNHOLE, CROSS WELL MEASUREMENT SYSTEM

CROSS-REFERNCE TO RELATED APPLICATIONS

The present application is a continuation-in-part of U.S. patent application Ser. No. 10/931,864 filed on Sep. 1, 2004 now abandoned and entitled High-Speed, Downhole, Seismic Measurement System. U.S. patent application Ser. No. 10/931,864 is herein incorporated by reference for all that it contains.

BACKGROUND OF THE INVENTION

This invention relates to oil and gas drilling, and more particularly to apparatus and methods for gathering seismic data relating to subsurface formations.

In the oil and gas exploration industry, it is useful for geologists to understand underground conditions, such as the type of source rock, reservoir rock, or entrapment areas that may indicate the presence of petroleum and other hydrocarbon reserves. Geologists have historically used several techniques to accomplish this end. For example, geologists may observe surface features, such as rock and soil types, or take core samples. Satellite images, gravity meters, magnetometers, sniffers, and the like, have also been used to detect conditions that may indicate the presence of oil, gas, or other hydrocarbons.

Currently, seismology is perhaps the most commonly used technique to detect the presence of oil and gas. Seismology is the science of mapping and detecting subsurface structures by interpreting the behavior of shock waves traveling though subsurface rock, water, hydrocarbons, or other materials. Shock waves may be generated by devices such as compressed-air guns, thumper trucks, and explosives. These shocks waves may be detected and measured by hydrophones, geophones, or seismometers after the shock waves pass through or are reflected by subsurface structures. These measurements may be used to create seismic surveys. Also, with the advent of three-dimensional seismic surveys, drillers can tap into hydrocarbon-bearing reservoirs with greater accuracy than previous two-dimensional surveys. Nevertheless, although seismology generally provides more usable information than other detection techniques, a drilling company may still only have a 10% chance of finding a new oil field using the technique.

Although above-surface seismic exploration methods have been used extensively, more recently, seismic measurements are taken downhole inside a well or borehole. This method may improve the quality of seismic data gathered because the measurements are taken closer to subsurface formations of interest, and because seismic wave attenuation and noise are reduced. Such methods are often referred to as downhole seismic, and more particularly as single-well seismic and cross-well seismic. These measurements are generally taken be placing seismic receivers and seismic wave generators in the borehole.

Nevertheless, current downhole seismic data gathering techniques are hindered by several shortcomings. For example, because current seismic devices, such as geophones and seismic wave generators, are often lowered into the borehole on wirelines, it may be necessary to temporarily stop drilling while the wireline is lowered into or retrieved from the borehole. This process can be quite expensive, not only because of the rig time consumed, but because running the seismic logs can be very expensive.

Thus, what are needed are improved apparatus and methods for gathering seismic data at high speeds, while minimizing drill rig down time. What are further needed are apparatus and methods for gathering seismic data while drilling or after drilling has stopped but without lowering a wireline into the borehole. Finally, what are needed are apparatus and methods for transmitting large quantities of seismic data to the surface at high speeds.

SUMMARY OF THE INVENTION

In view of the foregoing, the present invention relates to improved apparatus and methods for gathering data regarding subsurface formations while minimizing drill rig down time. The present invention further relates to apparatus and methods for gathering data while drilling or, alternatively, after drilling has stopped but without lowering a wireline into the borehole. Finally, the present invention relates to apparatus and methods for transmitting large quantities of data to the surface at high speeds.

In one aspect of the invention, a high-speed measurement system has a first and a second well bore. A first and second plurality of network nodes are integrated into and spaced at intervals along the first and second well bores, respectively. A communications channel connects each plurality of network nodes forming a first and second downhole network. A signal source is in communication with the first downhole network and a signal receiver is in communication with the second downhole network; and a common clock source is in communication with both the signal source and the signal receiver over the first and second downhole networks, respectively. The signal source and signal receiver are synchronized with the clock source and the signal source is adapted to send a signal to the signal receiver through a subterranean formation. At least one of the downhole networks is integrated into a downhole tool string. In some embodiments, both of the plurality of downhole networks are integrated into downhole tool strings. It should be understood that the term clock source include any oscillator, crystal, transistor, RC circuit, LC circuit, RLC circuit or combinations thereof adapted to keep time.

The signal source may be an acoustic source, an induction source, an electric source, a nuclear source, a seismic source, a sonic source, an explosive, a compressed gun, a vibrator, a sparker, or combinations thereof. The at least one tool string may be drill string, production string, injection string, casing string or combinations thereof. In the preferred embodiment, the signal source and receiver are used to create a cross-well map of a subterranean formation between the first and second well bores.

The communications channel may comprise a plurality of segments which terminate proximate the ends of each tool string component. The segments are preferably in magnetic communication via inductive couplers, although optical and direct electrical couplers are within the scope of the invention. The inductive couplers may comprise a coil disposed within a trough of magnetically conductive electrically insulating material. Such a material may be ferrite and/or comprise iron or nickel.

The common clock source may be disposed within a node of either of the networks, a GPS, a server, surface equipment, a satellite, or combinations thereof. In some embodiments, each downhole node comprises a downhole clock. A processing element may be in electrical communication with the common clock and the downhole clocks. The processing element may be adapted to process the latency between the common clock and at least one downhole clock. In some embodiments, the processing element is adapted to send a periodic signal over at least one of the networks. The source and/or receiver may be in communication with one of the downhole clocks. A downhole processing element may also be in communication with either the source or receiver and be adapted to synchronize the downhole clock with the synchronization pulse.

In another aspect of the present invention, a method comprises the steps of providing a downhole signal source in communication with a first network integrated into a first well bore; providing a downhole signal receiver in communication with a second network integrated into a second well bore; the source being in communication with a first downhole clock in the first downhole network and the receiver being in communication with a second downhole clock in the second downhole network; synchronizing the first clock with a common clock source in communication with both the first and second clock; and synchronizing the second clock with the common clock source. The method may also include a step of time stamping the activation of the source and time stamping the arrival of the signal at the receiver.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices, or the like. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
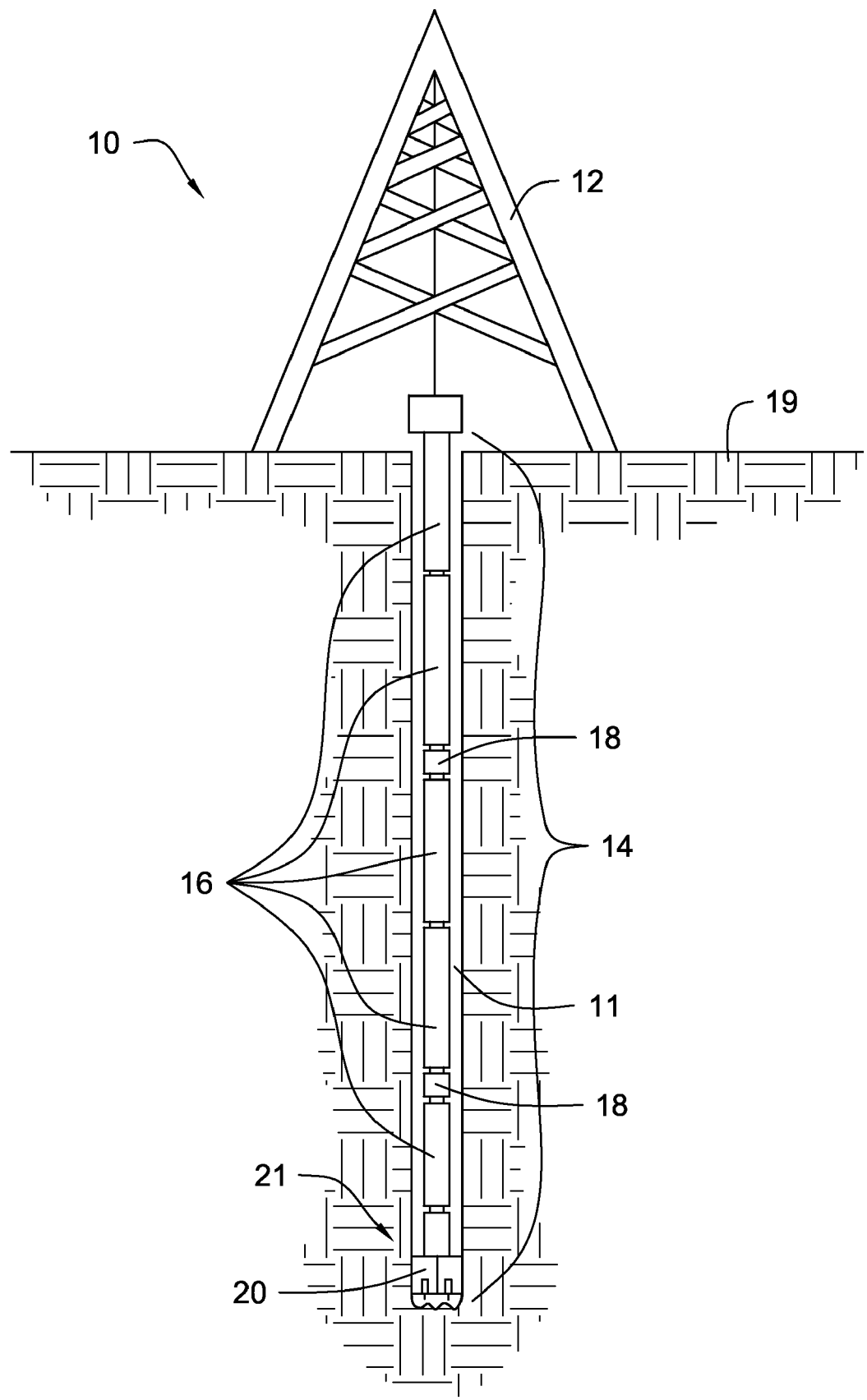
FIG. 1 is a profile view of one embodiment of a drill rig and drill string in accordance with the invention.

Referring to FIG. 1, a drill rig 10 may include a derrick 12 and a drill string 14 comprised of multiple sections of drill pipe 16 and other downhole tools 16. The drill string 14 is typically rotated by the drill rig 10 to turn a drill bit 20 that is loaded against the earth 19 to form a borehole 11. Rotation of the drill bit 20 may alternately be provided by other downhole tools such as drill motors, or drill turbines (not shown) located adjacent to the drill bit 20.

A bottom-hole assembly 21 may include a drill bit 20, sensors, and other downhole tools such as logging-while-drilling ("LWD") tools, measurement-while-drilling ("MWD") tools, diagnostic-while-drilling ("DWD") tools, or the like. Other downhole tools may include heavyweight drill pipe, drill collar, stabilizers, hole openers, sub-assemblies, under-reamers, rotary steerable systems, drilling jars, drilling shock absorbers, and the like, which are all well known in the drilling industry.

While drilling, a drilling fluid is typically supplied under pressure at the drill rig 10 through the drill string 14. The drilling fluid typically flows downhole through the central bore of the drill string 14 and then returns uphole to the drill rig 10 through the borehole 11, or annulus 11. Pressurized drilling fluid is circulated around the drill bit 20 to provide a flushing action to carry cuttings to the surface.

Figure 2:
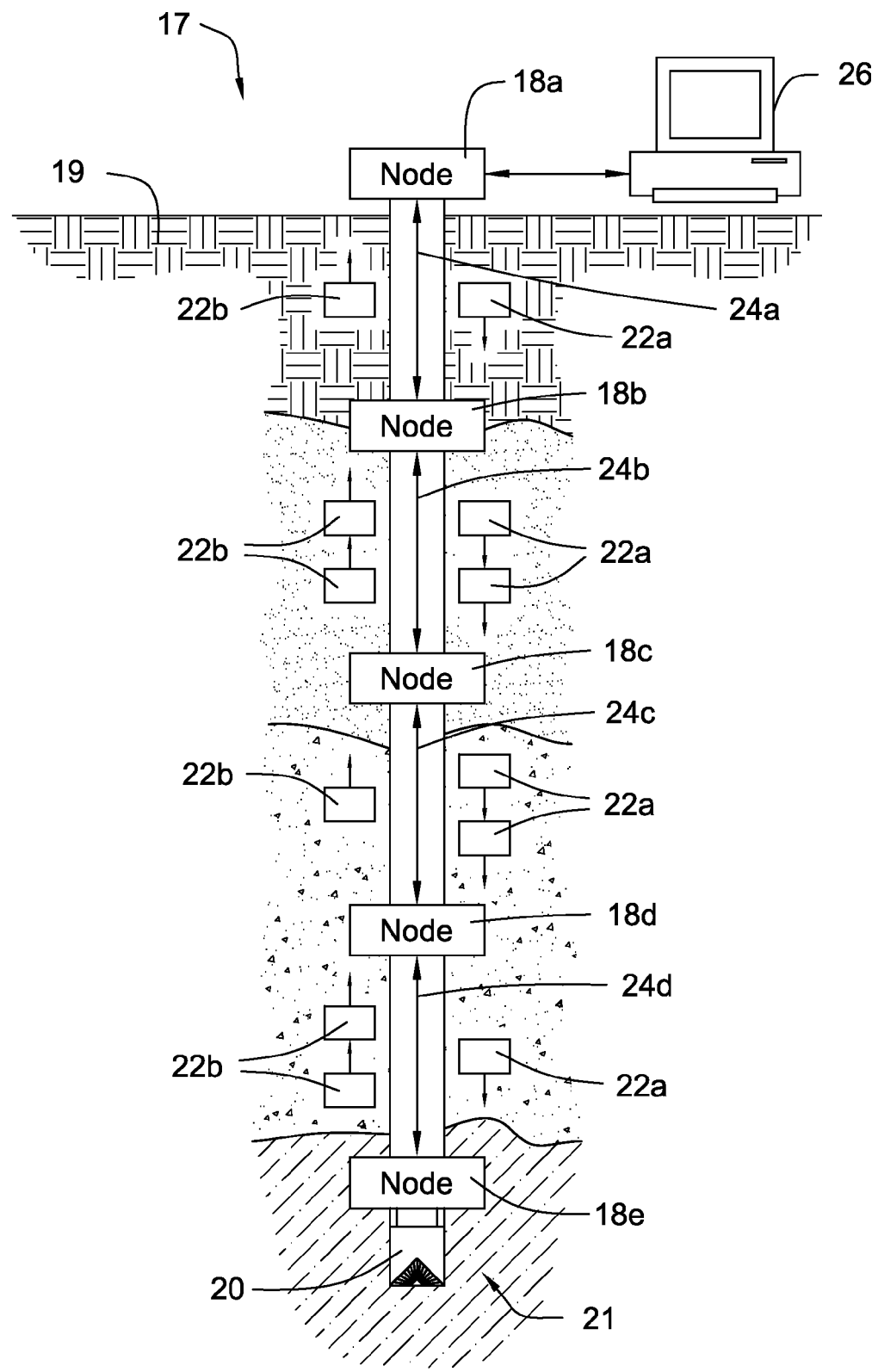
FIG. 2 is a schematic block diagram illustrating one embodiment of a downhole network in accordance with the invention, integrated into the drill string.

Referring to FIG. 2, while continuing to refer generally to FIG. 1, in selected embodiments, a downhole network 17 may be used to transmit information along the drill string 14. The downhole network 17 may include multiple nodes 18a-e spaced at desired intervals along the drill string 14. The nodes 18a-e may be intelligent computing devices 18a-e, such as routers, or may be less intelligent connection devices, such as hubs, switches, repeaters, or the like, located along the length of the network 17. Each of the nodes 18 may or may not have a network address. A node 18e may be located at or near the bottom hole assembly 21. The bottom hole assembly 21 may include a drill bit 20, drill collar, and other downhole tools and sensors designed to gather data, perform various functions, or the like.

Other intermediate nodes 18b-d may be located or spaced along the network 17 to act as relay points for signals traveling along the network 17 and to interface to various tools or sensors located along the length of the drill string 14. Likewise, a top-hole node 18a may be positioned at the top or proximate the top of the drill string 14 to interface to an analysis device 26, such as a personal computer 26.

Communication links 24a-d may be used to connect the nodes 18a-e to one another. The communication links 24a-d may consist of cables or other transmission media integrated directly into the tools 16 making up the drill string 14, routed through the central bore of the drill string 14, or routed external to the drill string 14. Likewise, in certain embodiments, the communication links 24a-d may be wireless connections. In selected embodiments, the downhole network 17 may function as a packet-switched or circuit-switched network 17.

To transmit data along the drill string 14, packets 22a, 22b may be transmitted between the nodes 18a-e. Some packets 22b may carry data gathered by downhole tools or sensors to uphole nodes 18a, or may carry protocols or data necessary to the function of the network 17. Likewise, other packets 22a may be transmitted from uphole nodes 18a to downhole nodes 18b-e. For example, these packets 22a may be used to carry control signals or programming data from a top-hole node 18a to downhole tools or sensors and to downhole nodes 18b-e. Thus, a downhole network 17 may provide a high-speed means for transmitting data and information between downhole components and devices located at or near the earth's surface 19.

Figure 3:
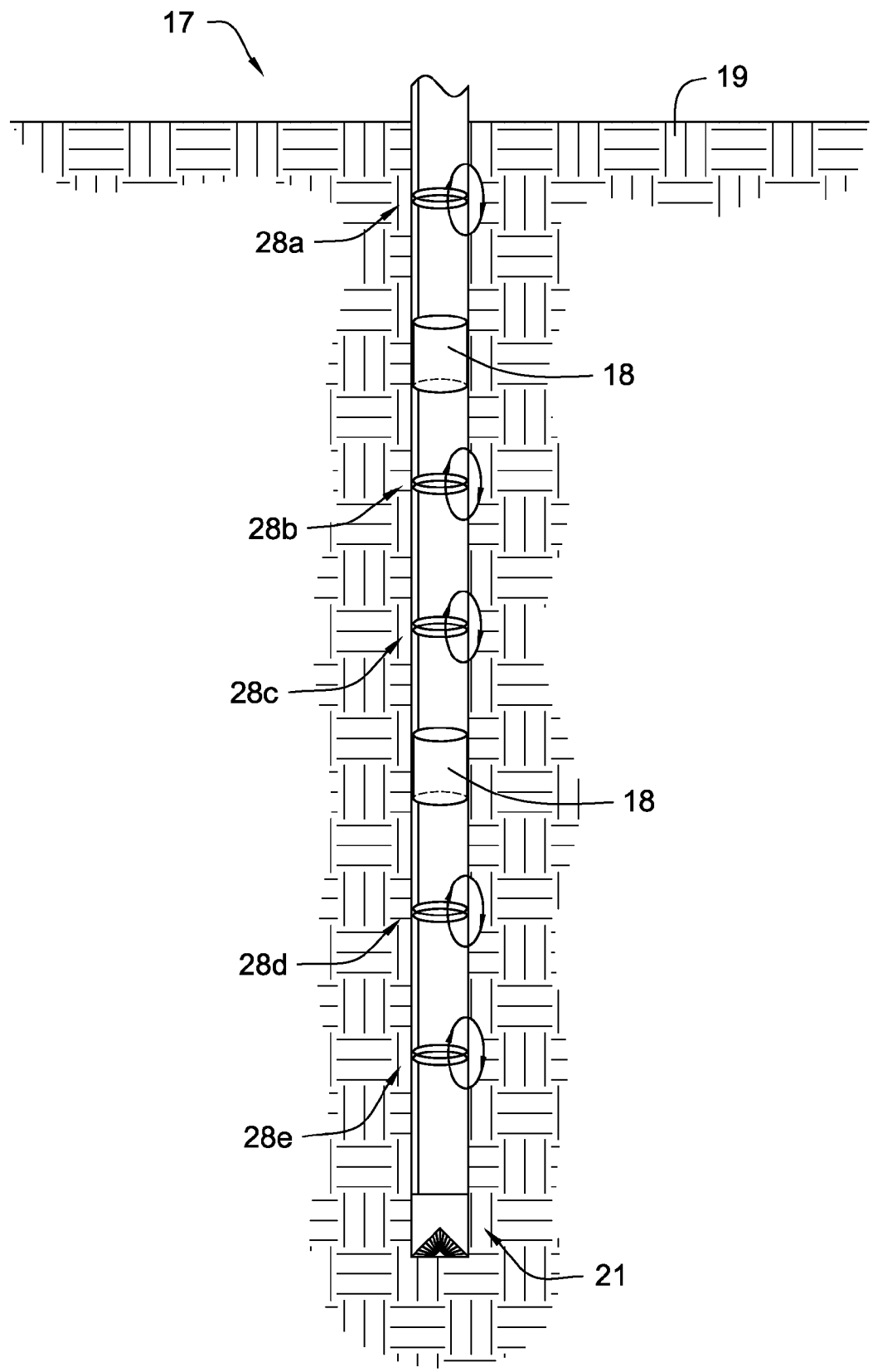
FIG. 3 is a schematic block diagram illustrating one method of transmitting data along the drill string.

Referring to FIG. 3, in one embodiment, a downhole network 17 in accordance with the invention may include various nodes 18 spaced at selected intervals along the drill string 14. Each of the nodes 18 may communicate with a bottom-hole assembly 21. As data travels along the network 17, transmission elements 28a-e may be used to transmit data across the tool joints. For information regarding one embodiment of suitable transmission elements 28a-e and other downhole components, the reader is referred to the Hall patent, U.S. Pat. No. 6,670,880, which is herein incorporated by reference.

In the Hall patent, inductive coils are used to transmit data signals across the tool joints. As described therein, a first inductive coil converts an electrical current to a magnetic field that is communicated across the tool joint. A second inductive coil detects the magnetic field and converts the magnetic field back to an electrical current. This allows a data signal to be transmitted across a tool joint even though an electrical connection may be absent. Nevertheless, in other embodiments, the transmission elements 28a-e may also transmit data across the tool joint through direct contact.

Figure 4:
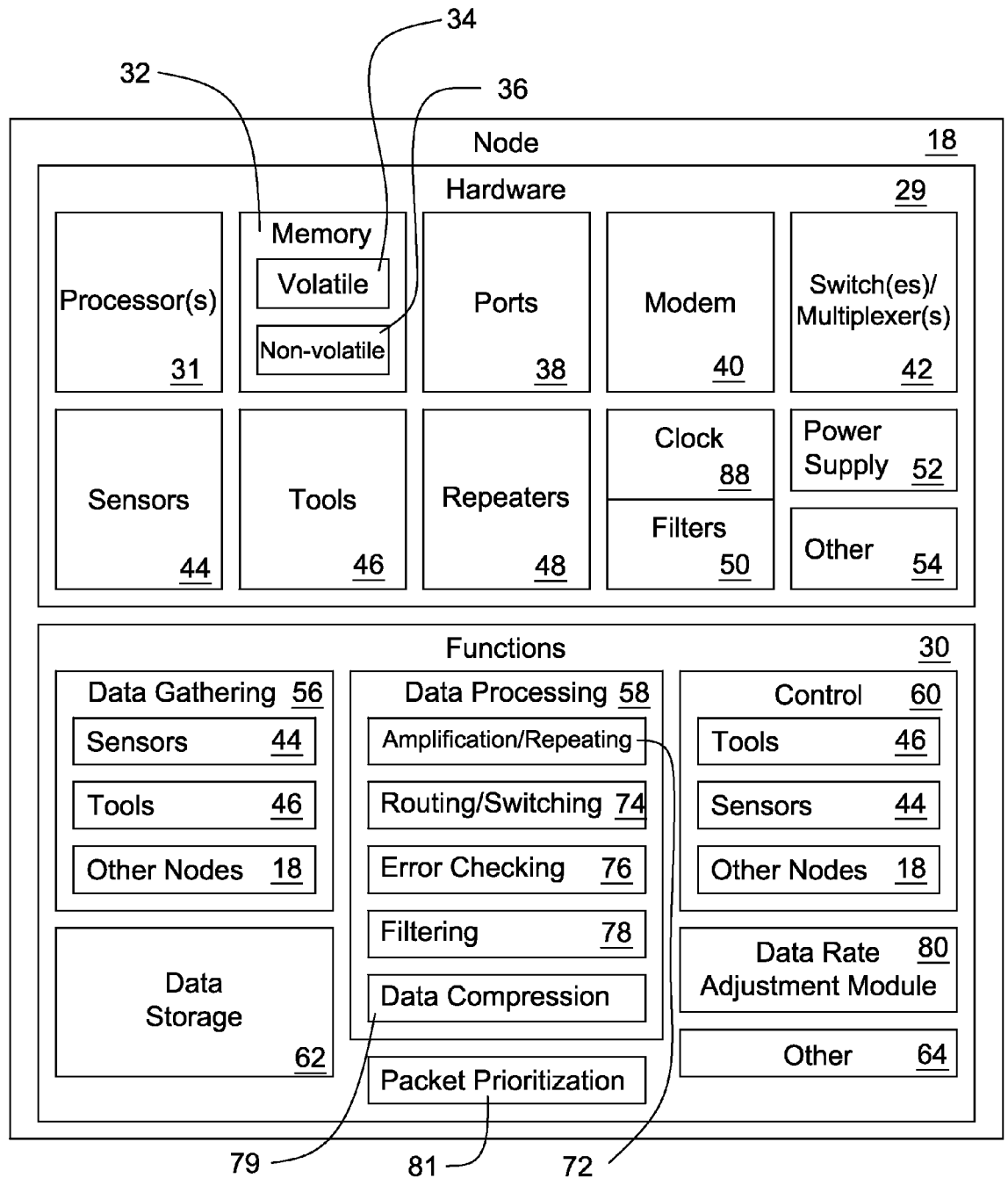
FIG. 4 is a schematic block diagram illustrating various types of hardware and software modules that may be included in a network node in accordance with the invention.

Referring to FIG. 4, a network node 18 in accordance with the invention may include a combination of hardware 29 and software providing various functions 30. The functions 30 may be provided strictly by the hardware 29, software executable on the hardware 29, or a combination thereof. For example, hardware 29 may include one or several processors 31 capable of processing data as well as executing instructions. The processor 31 or processors 31 may include hardware such as busses, clocks, cache, or other supporting hardware.

Likewise, the hardware 29 may include volatile 34 and non-volatile 36 memories 32 to store data and provide staging areas for data transmitted between hardware components 29. Volatile memory 34 may include random access memory (RAM), or equivalents thereof, providing high-speed memory storage. Memory 32 may also include selected types of non-volatile memory 36 such as read-only-memory (ROM), PROM, EEPROM, or the like, or other long-term storage devices, such as hard drives, floppy disks, flash memory, or the like. Ports 38 such as serial ports, parallel ports, or the like, may be used to interface to other devices connected to the node 18, such as sensors, receivers, signal sources or tools located proximate the node 18. A downhole clock 88 disposed within the node 18 may be in communication with signal source or receiver located proximate the node 18. The node may also provide the function of time stamping events occurring to the source or receiver.

A modem 40 may be used to modulate digital data onto an analog carrier signal for transmission over network cable or other transmission media, and likewise, demodulate the analog signals when received. A modem 40 may include various built in features including but not limited to error checking, data compression, or the like. In addition, the modem 40 may use any suitable modulation type such as ASK, PSK, QPSK, OOK, PCM, FSK, QAM, PAM, PPM, PDM, PWM, or the like, to name a few. The choice of a modulation type may depend on a desired data transmission speed, the bandwidth capability of the network hardware, as well as unique operating conditions that may exist in a downhole environment. Likewise, the modem 40 may be configured to operate in full-duplex, half-duplex, or other mode. The modem 40 may also use any of numerous networking protocols currently available, such as collision-based protocols like Ethernet, token-based, or asynchronous transfer (ATM) protocols.

A node 18 may also include one or several switches 42, multiplexers 42, or both. A switch 42 may filter, forward, and route traffic on the network. Multiplexers 42 (and corresponding demultiplexers 42) may transmit multiple signals over a single communications line or a single channel. The multiplexers 42 may use any known protocol to transmit information over the network 17, including but not limited to frequency-division multiplexing, time-division multiplexing, statistical time-division multiplexing, wave-division multiplexing, code-division multiplexing, spread spectrum multiplexing, or combinations thereof. A node 18 may also include various downhole tools 46 and sensors 44. These tools 46 and sensors 44 may be integrated into the node 18 (i.e., share the same circuitry) or interface to the node 18 through ports 38. Tools 46 and sensors 44 may include devices such as coring tools, mud logging devices, pore fluid sensors, resistivity sensors, induction sensors, sonic devices, radioactivity sensors, electrical potential tools, temperature sensors, accelerometers, imaging devices, seismic devices, mechanical devices such as caliper tools or free point indicators, pressure sensors, inclinometers, surveying tools, navigation tools, or the like. Signal sources may also be placed at the nodes, which may include acoustic sources, induction sources, electric sources, nuclear sources, seismic sources, sonic sources, explosives, compressed guns, vibrators, sparkers, or combinations thereof.

These tools 46 and sensors 44 may be configured to gather data for analysis uphole, and may also receive data such as control signals, programming data, or the like, from uphole sources. For example, control signals originating at the surface may direct a sensor 44 to take a desired measurement. Likewise, selected tools 46 and sensors 44 may be re-programmed through the network 17 without extracting the tools from the borehole.

A drill string 14 may extend into the earth 20,000 feet or more. As a result, signal loss or attenuation may be a significant factor when transmitting data along the downhole network 17. This signal loss or attenuation may vary according to the network hardware. The reader is referred to the Hall patent for a description of one embodiment of various hardware components that may be used to construct the network 17. For example, a drill string 14 is typically comprised of multiple segments of drill pipe 16 or other drill tools 16. As a result, signal loss may occur each time a signal is transmitted from one downhole tool 16 to another 16. Since a drill string may include several hundred sections of drill pipe 16 or other tools 16, the aggregate attenuation can be significant. Likewise, attenuation may also occur in the cable or other transmission media routed along the drill string 14.

To compensate for signal attenuation, amplifiers 48, or repeaters 48, may be spaced at selected intervals along the network 17. The amplifiers 48 may receive a data signal, amplify it, and transmit it to the next node 18. Like amplifiers 48, repeaters 48 may be used to receive a data signal and retransmit it at higher power. However, unlike amplifiers 48, repeaters 48 may remove noise from the data signal. This may be done by demodulating the data from the transmitted signal and re-modulating it onto a new carrier.

Likewise, a node 18 may include various filters 50. Filters 50 may be used to filter out undesired noise, frequencies, and the like that may be present or introduced into a data signal traveling up or down the network 17. Likewise, the node 18 may include a power supply 52 to supply power to any or all of the hardware 29. The node 18 may also include other hardware 54, as needed, to provide other desired functionality to the node 18.

The node 18 may provide various functions 30 that are implemented by software, hardware, or a combination thereof. For example, the node's functions 30 may include data gathering 56, data processing 58, control 60, data storage 62, or other functions 64. Data may be gathered 56 from sensors 44 located downhole, tools 46, or other nodes 18 in communication with a selected node 18. This data 56 may be transmitted or encapsulated within data packets transmitted up and down the network 17.

Likewise, the node 18 may provide various data processing functions 58. For example, data processing may include data amplification 72 or repeating 72, routing 74 or switching 74 data packets transmitted along the network 17, error checking 76 of data packets transmitted along the network 17, filtering 78 of data, as well as data compression 79 and decompression 79. Likewise, a node 18 may process various control signals 60 transmitted from the surface to tools 46, sensors 44, or other nodes 18 located downhole. A node 18 may store data that has been gathered from tools 46, sensors 44, or other nodes 18 within the network 17. Similarly, the node 18 may include other functions 64, as needed.

In selected embodiments, a node 18 may include a data rate adjustment module 80. The data rate adjustment module 80 may monitor network traffic traveling in both uphole and downhole directions. The data rate adjustment module 80 may optimize the network's settings and efficiency by adjusting the allocation of bandwidth for data traveling uphole and downhole. As is typical in most communication systems, data rates may be limited by the available bandwidth of a particular system. For example, in downhole drilling systems, available bandwidth may be limited by the transmission cable, hardware used to communicate across tool joints, electronic hardware in the nodes 18, the downhole environment, or the like. Thus, the data rate adjustment module 80 may efficiently allocate the limited available bandwidth where it is most needed.

For example, in selected embodiments, most of the network traffic may flow from downhole tools 46 and sensors 44 to the surface for analysis. Thus, ordinarily, most of the network bandwidth may be allocated to traffic traveling uphole. Nevertheless, in some circumstances, more bandwidth may be needed for traffic traveling downhole. For example, in some cases, significant downhole bandwidth may be needed when reprogramming downhole tools 46 and sensors 44, or when sending large amounts of control data downhole. In these instances, the data rate adjustment module 80 may adjust the bandwidth to provide additional bandwidth to downhole traffic. In some instances, this may include reducing the allocated bandwidth for uphole traffic. Likewise, when the need for additional downhole bandwidth has abated, the data rate adjustment module 80 may readjust the available bandwidth by re-allocating bandwidth to uphole traffic.

In certain embodiments, the node 18 may include hardware or software to prioritize packets 81. Because various tools and sensors connected to the nodes 18 may gather many diverse types of data, such as pressure, temperature, seismic data, inclination, azimuth, salinity, or other data, to name a few, certain types of data may be more time sensitive, important, or have greater priority for any number of possible reasons. As such, it may be desirable that certain types of data reach the surface before other types of data in situations where data or packets are competing for bandwidth. In such cases, a node 18 may be configured to give priority to certain types of information or data packets.

For example, in selected embodiments, a node 18 may be configured to provide various "qualities of service" to different types of data or packets traveling through the network 17.

In selected embodiments, the network 17 may be configured to reserve certain resources along the route from source to destination, such as bandwidth, channels, or the like, for certain types of data. In this way, certain types of data may be transmitted in "real time" while others types data may experience some delay.

In certain embodiments, priority tags may be added to a packet to indicate the data's priority. The nodes 18 may parse these priority tags to determine which data or packets are to be given priority over the network 17. In other embodiments, information may be added to the packet that indicates the packet's age. For example, an older packet may indicate that the packet has experienced delay or other congestion within the network. As such, an older packet may be given priority over younger packets as it is transmitted through the network 17. As the packet passes from node 18 to node 18 in the network 17, each node 18 may adjust the age of the packet to account for delay incurred as the packet passes through the node 18.

Figure 5:
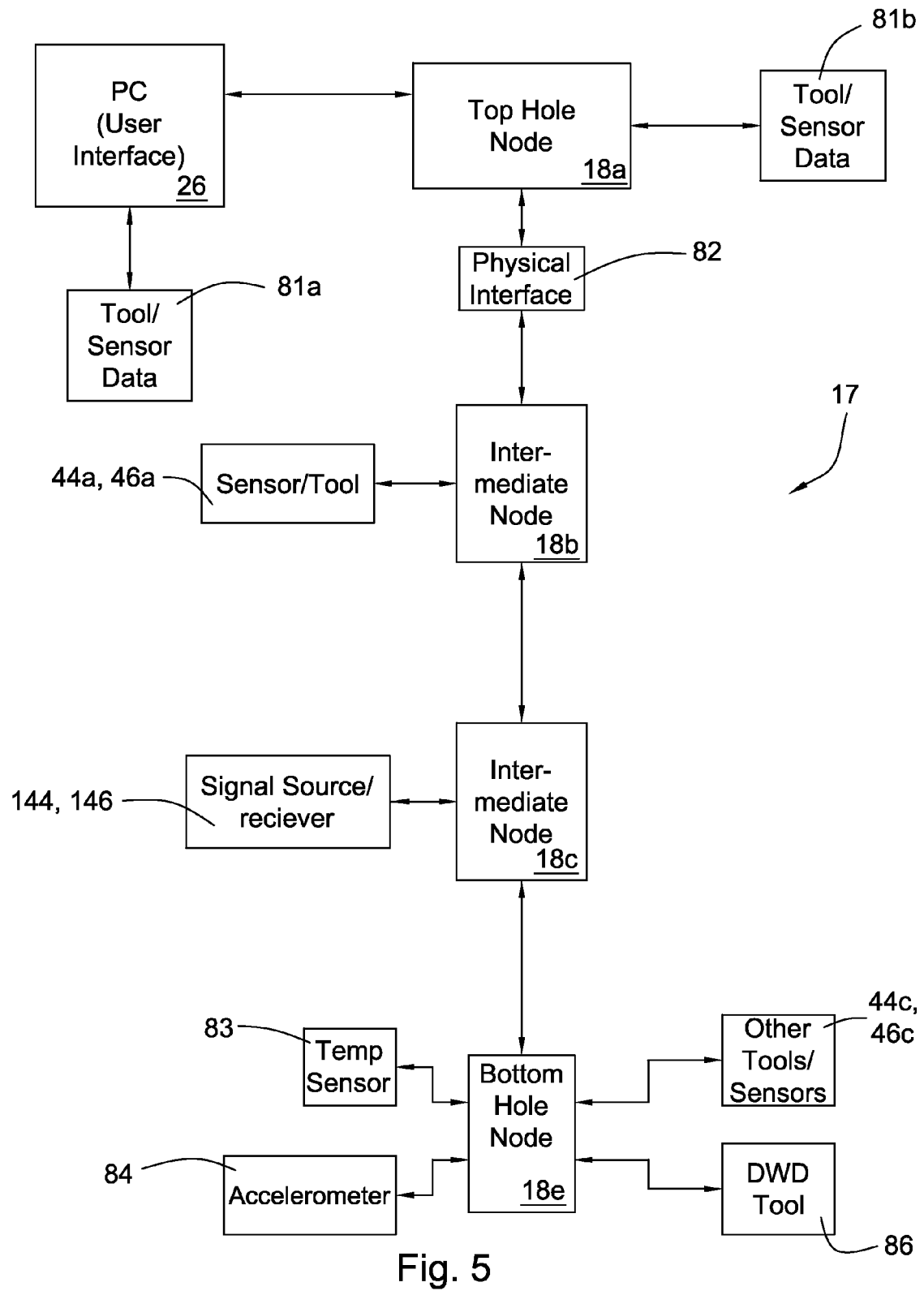
FIG. 5 is a high-level schematic block diagram illustrating one embodiment of a downhole network in accordance with the invention, interfacing with various tools and sensors.

Referring to FIG. 5, in one embodiment, a downhole network 17 in accordance with the invention may include a top-hole node 18a and a bottom-hole node 18e. A bottom-hole node 18e may interface to various components located in or proximate a bottom-hole assembly 21. For example, a bottom-hole node 18e may interface to a temperature sensor 83, an accelerometer 84, a DWD (diagnostic-while-drilling) tool 86, or other tools 46c or sensors 44c such as those listed in the description of FIG. 4.

A bottom-hole node 18e may communicate with an intermediate node 18c located at an intermediate point along the drill string 14. The intermediate node 18c may also provide an interface to signal sources 144 or receiver 146, which may be adapted for cross well mapping using seismic, induction, electric, acoustic, sonic, or nuclear devices. Likewise, other nodes 18, such as a second intermediate node 18b, may be located along the drill string 14 to communicate with other sensors 44b or tools 46a. Any number of intermediate nodes 18b, 18c may be used along the network 17 between the top-hole node 18a and the bottom-hole node 18e. In some embodiments, it may be preferable to have the source 144 and receiver 146 as close to the drill bit as possible.

In selected embodiments, a physical interface 82 may be provided to connect network components to a drill string 14. For example, since data may be transmitted directly up the drill string on cables or other transmission media integrated directly into drill pipe 16 or other drill string components 16, the physical interface 82 may provide a physical connection to the drill string so data may be routed off of the drill string 14 to network components, such as a top-hole node 18a, or personal computer 26.

For example, a top-hole node 18a may be operably connected to the physical interface 82. The top-hole node 18a may also be connected to an analysis device 26 such as a personal computer 26. The personal computer 26 may be used to analyze or examine data gathered from various downhole tools 46 or sensors 44. Likewise, tool and sensor data 81a may be saved or output from the analysis device 26. Likewise, in other embodiments, tool and sensor data 81b may be routed directly off the top-hole node 18a for analysis.

Figure 6:
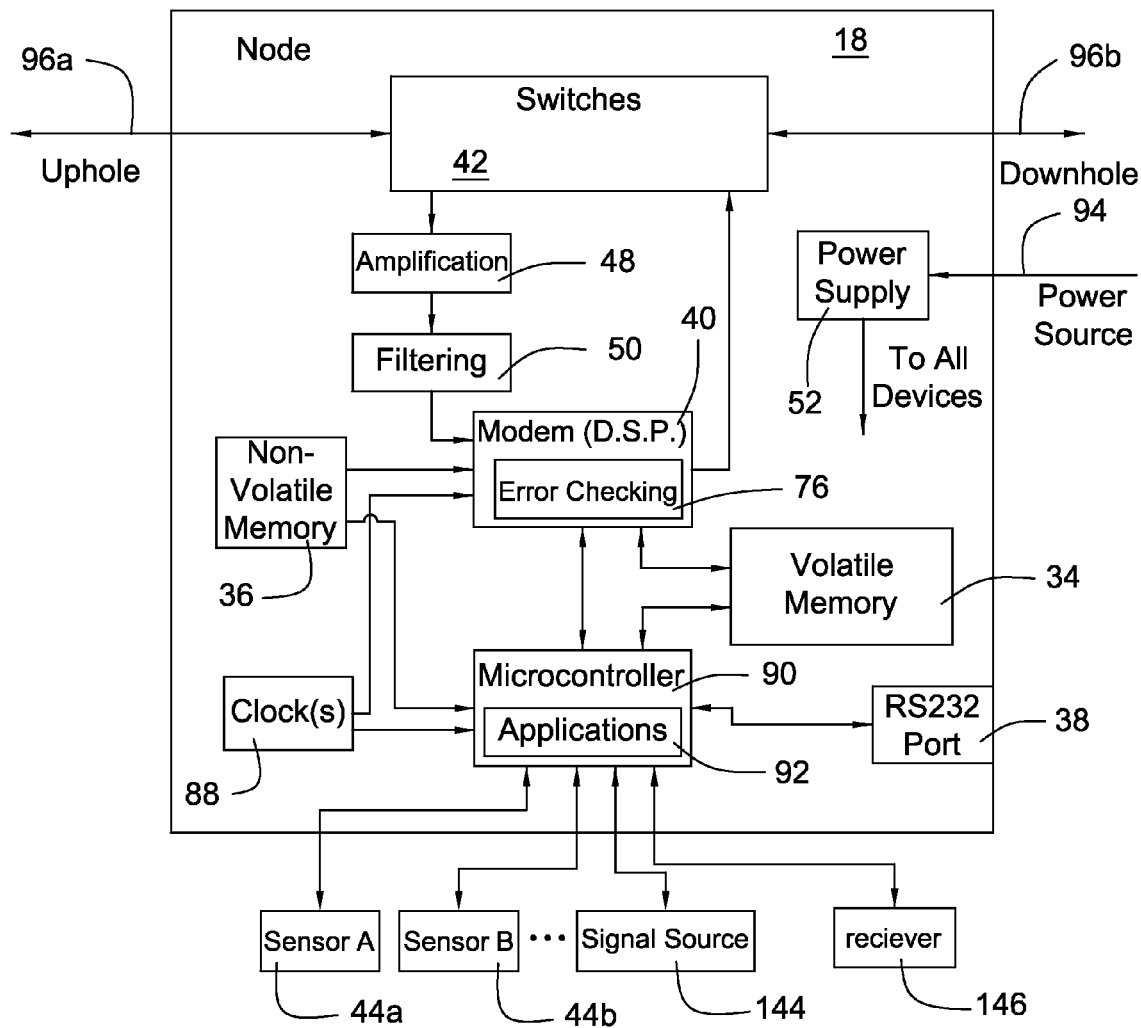
FIG. 6 is a more detailed schematic block diagram illustrating one embodiment of hardware and software components that may be included in a network node in accordance with the invention.

Referring to FIG. 6, in selected embodiments, a node 18 may include various components to provide desired functionality. For example switches 42, multiplexers 42, or a combination thereof may be used to receive, switch, and multiplex or demultiplex signals, received from other uphole 96a and downhole 96b nodes 18. The switches/multiplexers 42 may direct traffic such as data packets or other signals into and out of the node 18, and may ensure that the packets or signals are transmitted at proper time intervals, frequencies, or combinations thereof.

In certain embodiments, the multiplexer 42 may transmit several signals simultaneously on different carrier frequencies. In other embodiments, the multiplexer 42 may coordinate the time-division multiplexing of several signals. Signals or packets received by the switch/multiplexer 42 may be amplified 48 and filtered 50, such as to remove noise. In certain embodiments received signals may simply be amplified 48. In other embodiments, the signals may be received, data may be demodulated therefrom and stored, and the data may be remodulated and retransmitted on a selected carrier frequency having greater signal strength. A modem 40 may be used to demodulate digital data from signals received from the switch/multiplexer and modulate digital data onto carrier signals for transfer to the switches/multiplexer for transmission uphole or downhole.

The modem 40 may also perform various tasks such as error-checking 76 and data compression. The modem 40 may also communicate with a microcontroller 90. The microcontroller 90 may execute any of numerous applications 92. For example, the microcontroller 90 may run applications 92 whose primary function is to acquire data from one or a plurality of sensors 44a-c. For example, the microcontroller 90 may interface to sensors 44 such as inclinometers, thermocouplers, accelerometers, imaging devices, seismic data gathering devices, or other sensors such as those listed in the description of FIG. 4. Thus, the node 18 may include circuitry that functions as a data acquisition tool.

In other embodiments, the microcontroller 90 may run applications 92 that may control various tools 46 or sensors 44 located downhole. That is, not only may the node 18 be used as a repeater, and as a data gathering device, but it may also be used to receive or provide control signals to control selected tools 46 and sensors 44, as needed. The node 18 may also include a volatile memory device 34, such as a FIFO 34 or RAM 34, that may be used to store data needed by or transferred between the modem 40 and the microcontroller 90.

Other components of the node 18 may include non-volatile memory 36, which may be used to store data, such as configuration settings, node addresses, system settings, and the like. One or several clocks 88 may be provided to provide clock signals to the modem 40, the microcontroller 90, signal source 144, receivers 146, or any other device. A power supply 52 may receive power from an external power source 94 such as batteries. The power supply 52 may provide power to any or all of the components located within the node 18. Likewise, an RS232 port 38 may be used to provide a serial connection to the node 18.

Thus, a node 18, as more generally described in FIG. 4, may provide many more functions than those supplied by a simple signal repeater. The node 18 may provide many of the advantages of an addressable node on a local area network. The addressable node may amplify signals received from uphole 96a or downhole 96b sources, be used as a point of data acquisition, and be used to provide control signals to desired sensors 44 or tools 46. These represent only a few examples of the versatility of the node 18. Thus, the node 18, although useful and functional as a repeater, may have a greatly expanded capability.

Figure 7:
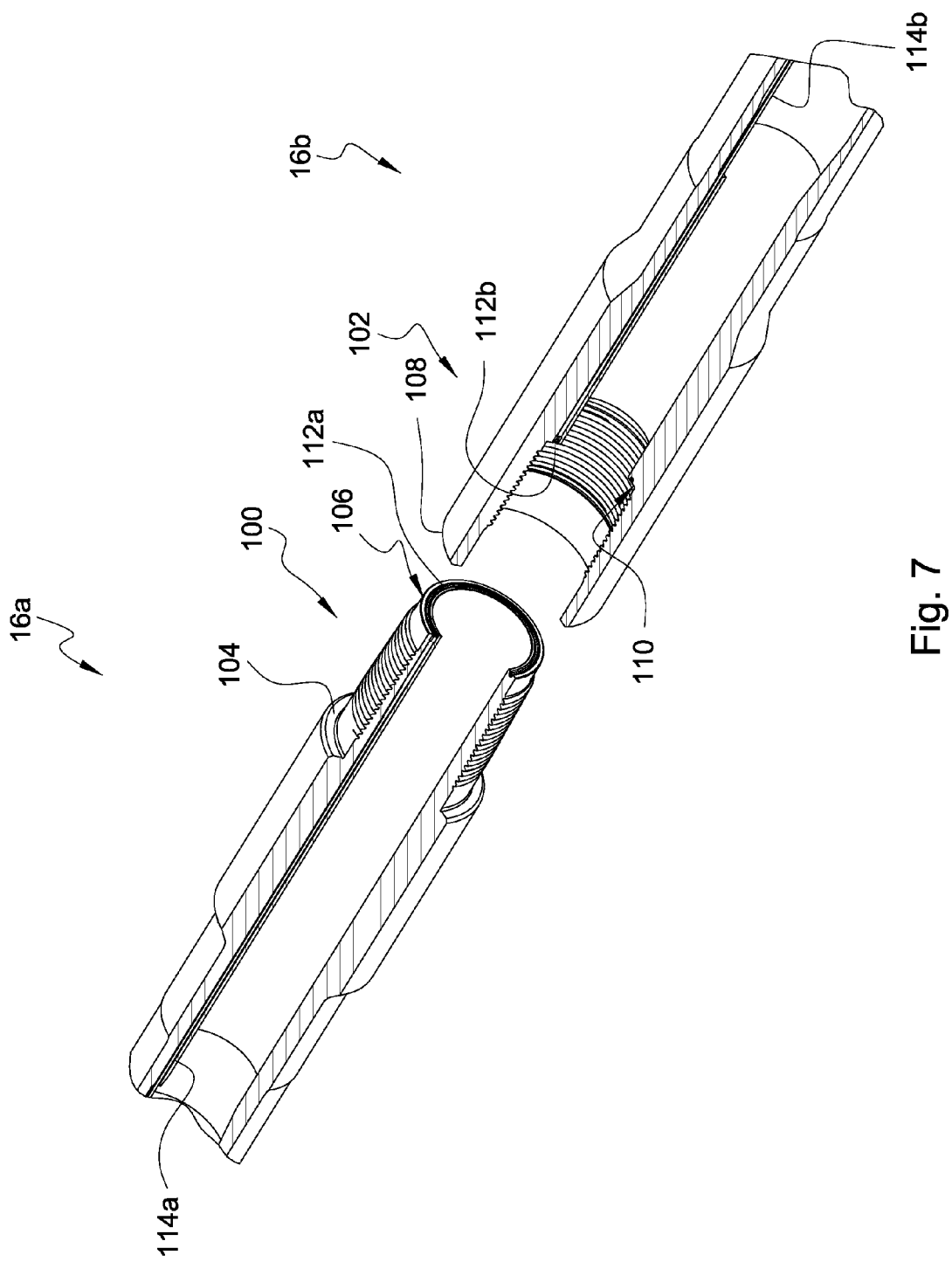
FIG. 7 is a perspective cross-sectional view of one embodiment of a downhole tool in accordance with the invention, wherein the downhole tool includes a transmission line and transmission elements to transmit data along the drill string.

Referring to FIG. 7, drilling pipe 16a, 16b, or other downhole tools 16a, 16b, may include a pin end 100 and a box end 102 to connect the drill pipes 16a, 16b or tools 16a, 16b together. In certain embodiments, a pin end 100 may include an external threaded portion that screws into an internal threaded portion of the box end 102. When threading a pin end 100 into a corresponding box end 102, various shoulders may engage one another to provide structural support to the tool joint.

For example, in some types of drill pipe 16, a pin end 100 may include a primary shoulder 104 and a secondary shoulder 106. Likewise, the box end 102 may include a corresponding primary shoulder 108 and secondary shoulder 110. Drill pipe 16 that includes both a primary and secondary shoulder is often called "double shouldered" pipe. A primary shoulder 104, 108 may be labeled as such to indicate that the primary shoulder 104, 108 provides the majority of the structural support to the joint between sections of drill pipe 16 or downhole tools 16. Nevertheless, a secondary shoulder 106 may also engage a corresponding secondary shoulder 110 in the box end 102, providing additional support or strength to drill pipes 16 or components 16 connected in series.

As was previously discussed, apparatus and methods are needed to transmit information along a string of connected drill pipes 16 or other components 16. As such, one major issue is the transmission of information across joints where a pin end 100 connects to a box end 102. In selected embodiments, a transmission element 112a may be mounted proximate a mating surface 106 or shoulder 106 on a pin end 100 to communicate information to another transmission element 112b located on a mating surface 110 or shoulder 110 of the box end 102. Cables 114a, 114b, or other transmission media 114a, 114b, may be operably connected to the transmission elements 112a, 112b to transmit information along the downhole tools 16a, 16b.

In certain embodiments, an annular recess may be provided in the secondary shoulder 106 of the pin end 100 and in the secondary shoulder 110 of the box end 102 to house each of the transmission elements 112a, 112b. The transmission elements 112a, 112b may have an annular shape and be mounted around the radius of the shoulders 106, 110. Since a secondary shoulder 106 may contact or come very close to a secondary shoulder 110 of a box end 102, a transmission element 112a may sit substantially flush with the secondary shoulder 106 on the pin end 100. Likewise, a transmission element 112b may sit substantially flush with the surface of the secondary shoulder 110 of the box end 102.

In selected embodiments, a transmission element 112a may transmit data to a corresponding transmission element 112b through direct electrical contact therewith. In other embodiments, the transmission element 112a may convert an electrical signal to a magnetic field or magnetic current. A corresponding transmission element 112b, located proximate the transmission element 112a, may detect the magnetic field or current. The magnetic field may induce an electrical current in the transmission element 112b. This electrical current may then be transmitted from the transmission element 112b by way of an electrical cable 114b routed along the drill pipe 16b or downhole component 16b.

Figure 8:
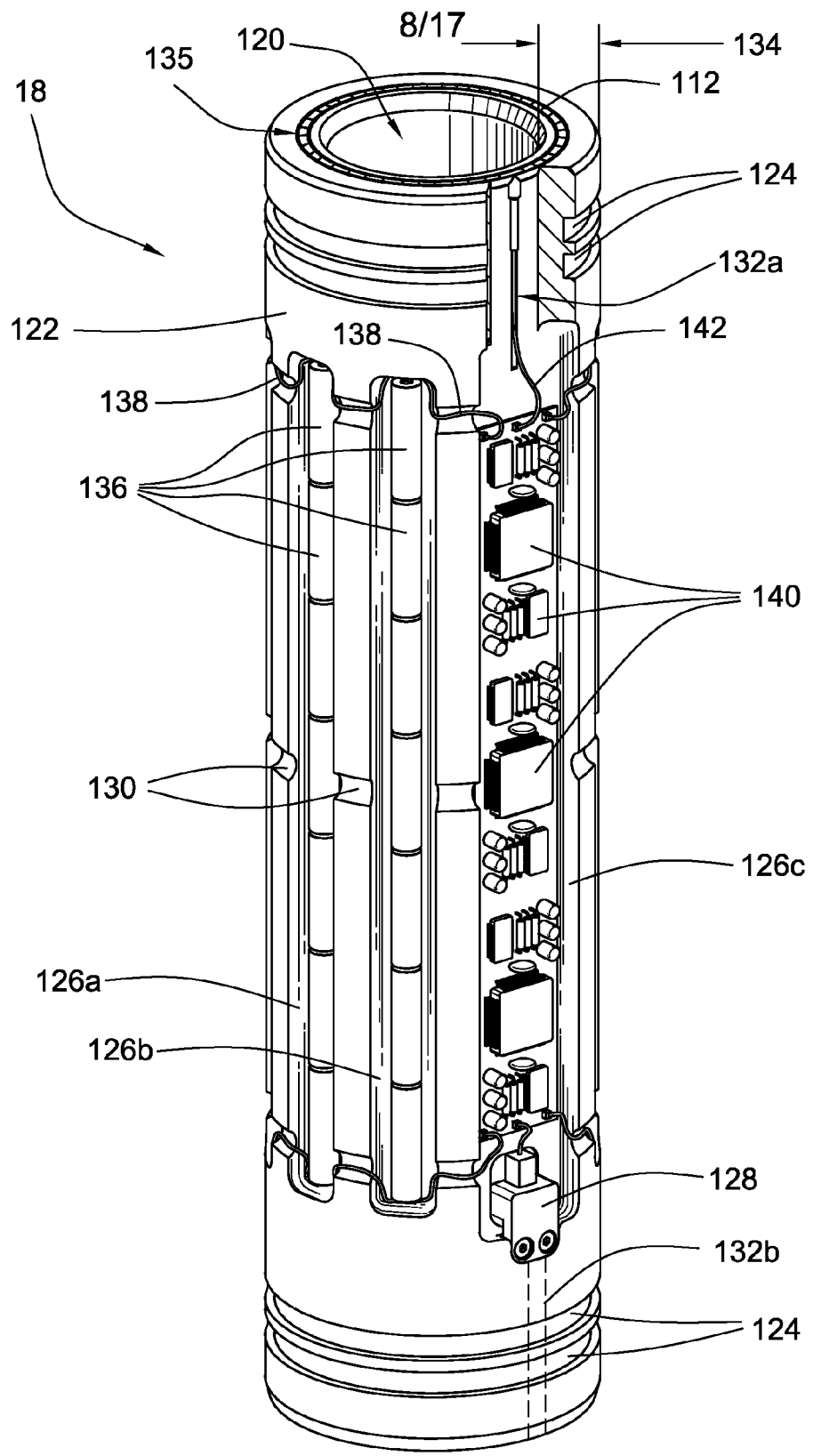
FIG. 8 is a perspective view of one embodiment of a network node in accordance with the invention.

Referring to FIG. 8, in certain embodiments, a node 18 may include a cylindrical housing 122 defining a central bore 120. The cylindrical housing 122 may be substantially circular. The central bore 120 may have a diameter that is slightly smaller than the inner bore diameter of a typical section of drill pipe 16 to accommodate and provide space to components of the node 18.

Nevertheless, in selected embodiments, as batteries and electronic components become more compact, it is feasible that the central bore 120 of the node 18 could be substantially equal to that normally encountered in sections of drill pipe 16 or other downhole tools 16. The node 18 may be configured for insertion into a host downhole tool 16. Thus, the node 18 may be removed or inserted as needed to access or service components located therein.

In selected embodiments, the node 18 may include one or several grooves 124 or seal contact surfaces 124 to seal the node 18 within a host downhole tool 16. Seals inserted into the seal contact surfaces 124 or grooves 124 may prevent fluids such as drilling mud, lubricants, oil, water, and the like from contaminating circuitry or components inside the node 18. Moreover, the entry of other substances such as dirt, rocks, gasses, and the like, may also be prevented.

In selected embodiments, the node 18 may include one or several recesses 126a-c to house various components contained in the node 18. Selected recesses 126c may contain node circuitry 140 as well as downhole tools 46 and sensors 44, such as seismic devices, that may fit in the recess 126c. Other recesses 126a, 126b may be used for batteries 136 or other components. One or several channels 130 may be milled or formed in the cylindrical housing 122 to provide for the routing of wires between recesses 126a-c. In selected embodiments, a connector 128 may be used to connect node circuitry 140, tools 46, and sensors 44 to a cable, wire, or other link, traveling up or down the drill string 14.

As illustrated, the node 18 may be characterized by a general wall thickness 134. Likewise, in regions proximate recesses 126 or other channels 130, a thinner wall thickness may be present. Nevertheless, a critical wall thickness should be maintained to provide structural reliability to the node 18 to support stresses encountered in a downhole environment. The cylindrical housing 122 may be constructed of any suitable material including steel, aluminum, plastics, and the like, capable of withstanding the pressures, stresses, temperatures, and abrasive nature of a downhole environment.

As illustrated, one or several transmission paths 132 may be milled or formed into the wall of the node 18 to provide an outlet for cables, wires, or other transmission media exiting the recess 126c. In selected embodiments, a connector 128 may be provided to simply link up with or connect to node circuitry 140, or in other embodiments, a channel 132a may enable the routing of cables, wires, and the like from the node circuitry 140 to a transmission element 112. A transmission element 112 may be provided in an annular recess 135 milled or otherwise formed into the end of the cylindrical housing 122.

As illustrated, a node 18 is equipped with components or circuitry 140 needed to provide functionality to the node 18. For example, batteries 136 connected in series or parallel may be inserted into selected recesses 126 of the node 18. Wires 138 may be routed through channels 130 interconnecting the recesses 126 to connect the batteries 136 together, or to connect the batteries 136 to node circuitry 140.

Likewise, node circuitry 140, or components 140, may be located within other recesses 126c. As was previously stated, a conductor 142, cable 142, or other transmission media 142, may travel from the node circuitry 140 to a transmission element 112. The transmission element 112 may transmit energy to another transmission element in contact therewith. The transmission element 112 may have an annular shape and may transmit energy by direct electrical contact, or may convert an electrical current to a magnetic field. The magnetic field may then be detected by another transmission element in close proximity thereto located on a subsequent downhole tool 16.

Figure 9:
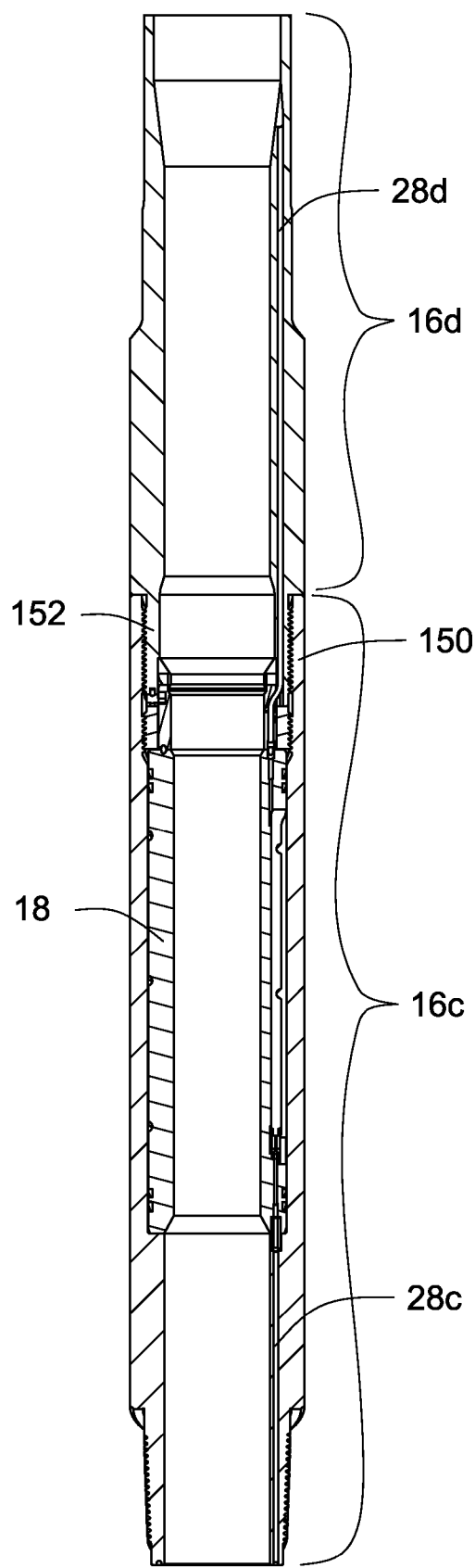
FIG. 9 is a cross-sectional view illustrating one embodiment of a downhole tool adapted to receive a network node in accordance with the invention.

Referring to FIG. 9, in selected embodiments, a downhole tool 16c, 16d or several downhole tools 16c, 16d may be adapted to accommodate the node 18 illustrated in FIG. 8. This may allow nodes 18 to be distributed at desired intervals along a drill string 14. For example, in selected embodiments, a node 18 may be inserted into a drill tool section 16c modified to receive the node 18. This section 16c may include a threaded portion 150, such as a box end, to receive the pin end 152 of another downhole tool 16d. As illustrated, a transmission line 28c, 28d may be used carry data up and down the drill string 14 from the node 18. Because the node 18 fits inside the inside diameter of the downhole tool 16c, the node's components, including node circuitry 140 and batteries 136, may be protected from the downhole environment.

The implementation illustrated in FIG. 9 provides one example of downhole tools 16 and other structures that may be used to accommodate a node 18 in accordance with the invention. As such, the illustrated embodiment is presented merely by way of example and is not intended to limit the node's implementation to this embodiment. In fact, a wide variety of different implementations may be possible and, therefore, fall within the scope of the present invention.

Figure 10:
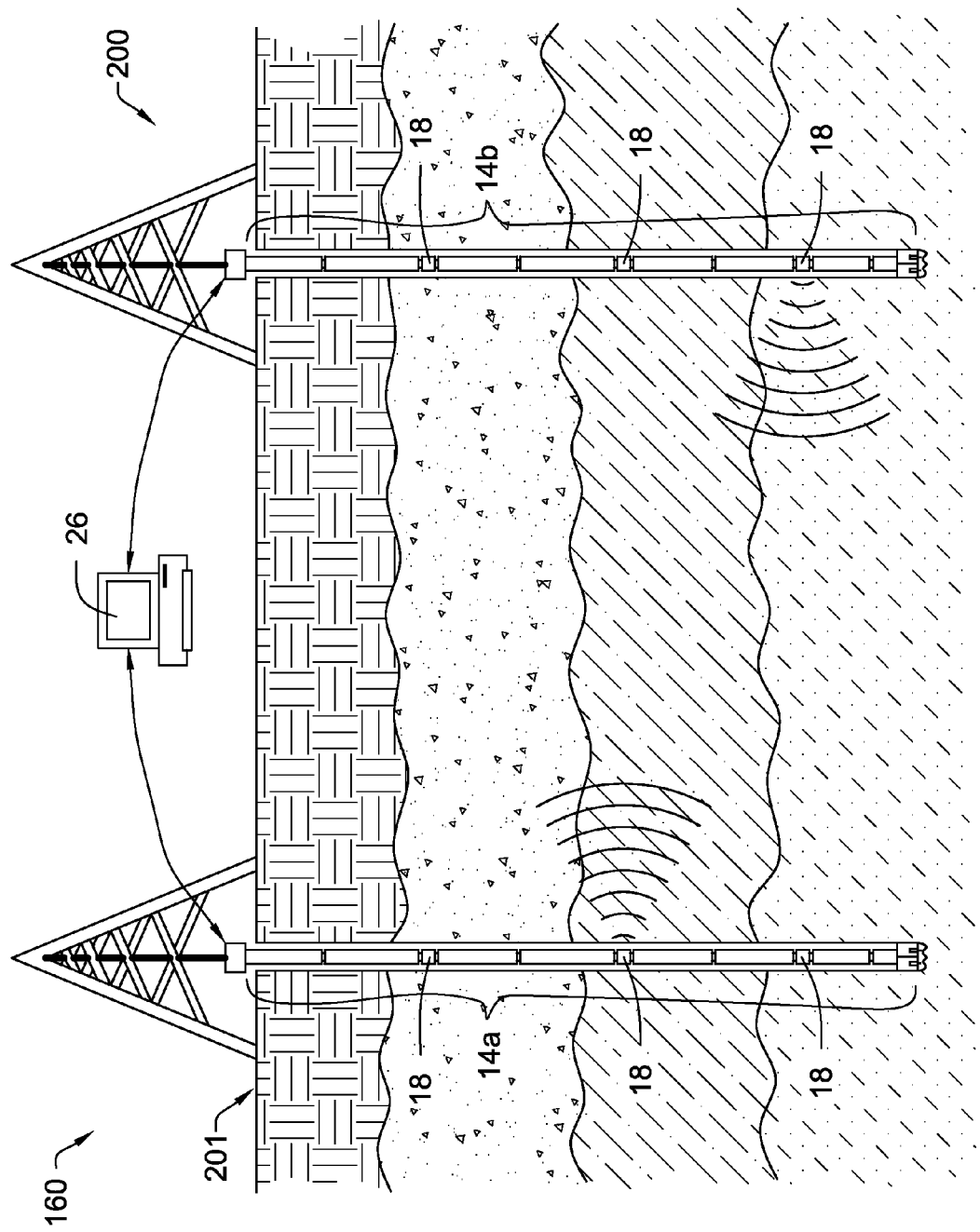
FIG. 10 is a cross-sectional view of a high-speed measurement system for gathering data between two or more wells or boreholes.

Referring to FIG. 10, in certain embodiments, a high-speed measurement system 160 in accordance with the invention may include one or more drill strings 14a, 14b comprising a series of nodes 18. Although drill strings are shown in FIG. 10, it should be understood that production strings or injection string may also be used in the present invention. In some embodiments, the networks are used to perform geothermal applications. The system 160 may be particularly useful in conducting cross-well tomography. This technique uses a receiver in one well to measure the properties of an acoustic, inductive, electric, nuclear or other signal generated by a source in another well as it passes through rock and other materials between the two wells. The measurements may be used to create a map of the intervening strata. Because the measurements are taken downhole closer to the strata of interest, higher frequency acoustic signals may be used in acoustic applications because the source and the receiver are closer together, thereby creating higher resolution images.

Each of the nodes 18 may include one or more measurement devices (see FIGS. 5 and 6), such as seismic receivers or seismic wave generators. Seismic wave generators may include devices such as compressed air devices, sparkers, vibrators, explosives, or the like. Seismic receivers may include devices such as hydrophones, geophones, seismometers, or the like, that may or may not be arranged into an array of similar devices. These seismic devices may be integrated into the nodes 18 or may simply interface with the nodes 18. Because the nodes 18 are interconnected to form a network that is functional both during drilling and when the drill string is stationary, the nodes 18 may be configured to rapidly transmit large amounts of seismic data to the surface where it may be stored, processed, and analyzed, by an analysis device 26 such as a computer 26.

Because the seismic devices are located downhole along the drill string, higher resolution measurements are possible. Furthermore, because of the high-speed capability of the network, more and better quality data may be transmitted to the surface. In selected embodiments, one or more drill strings 14 configured to transmit seismic data may be used to create two or three-dimensional seismic maps of subsurface structures. Because surveys such as three-dimensional surveys may contain many billions of bytes of data, a high-speed system may be particularly useful to transmit this large quantity of data to the surface. Furthermore, since time-consuming seismic measurement systems, such as wireline systems, are unnecessary, drill rig downtime may be minimized.

In other embodiments a nuclear tracer may be injected into the formation from the first tool string 200 which may be measured by the receiver 146 in the second tool string 201. In some embodiment, the simply injecting a fluid from the first tool string may create an increase in pressure proximate the second tool string which may be measured by the receiver as well. In such embodiment, amount of fluid communication between the first and second well may be identified.

Preferably there is more than one receiver on the second tool string so that the direction and dispersion of the signal may be measured. In some embodiments, it may be desirable to activate the signal source while the second tool string is in a first position, record the signals arrivals and then move the second tool string to second position and reactivate the source and record the arrival of the second set of signals by the receiver. This may be done as many times as are desirable and has the benefit of requiring less receivers while maintaining the ability to measure at many positions. In some embodiments, the first tool string may also comprise a receiver(s) and the second tool string may comprise a source(s). Thus signals may be exchanged between the tool string and recorded by either string to improve the quality of mapping.

Figure 11:
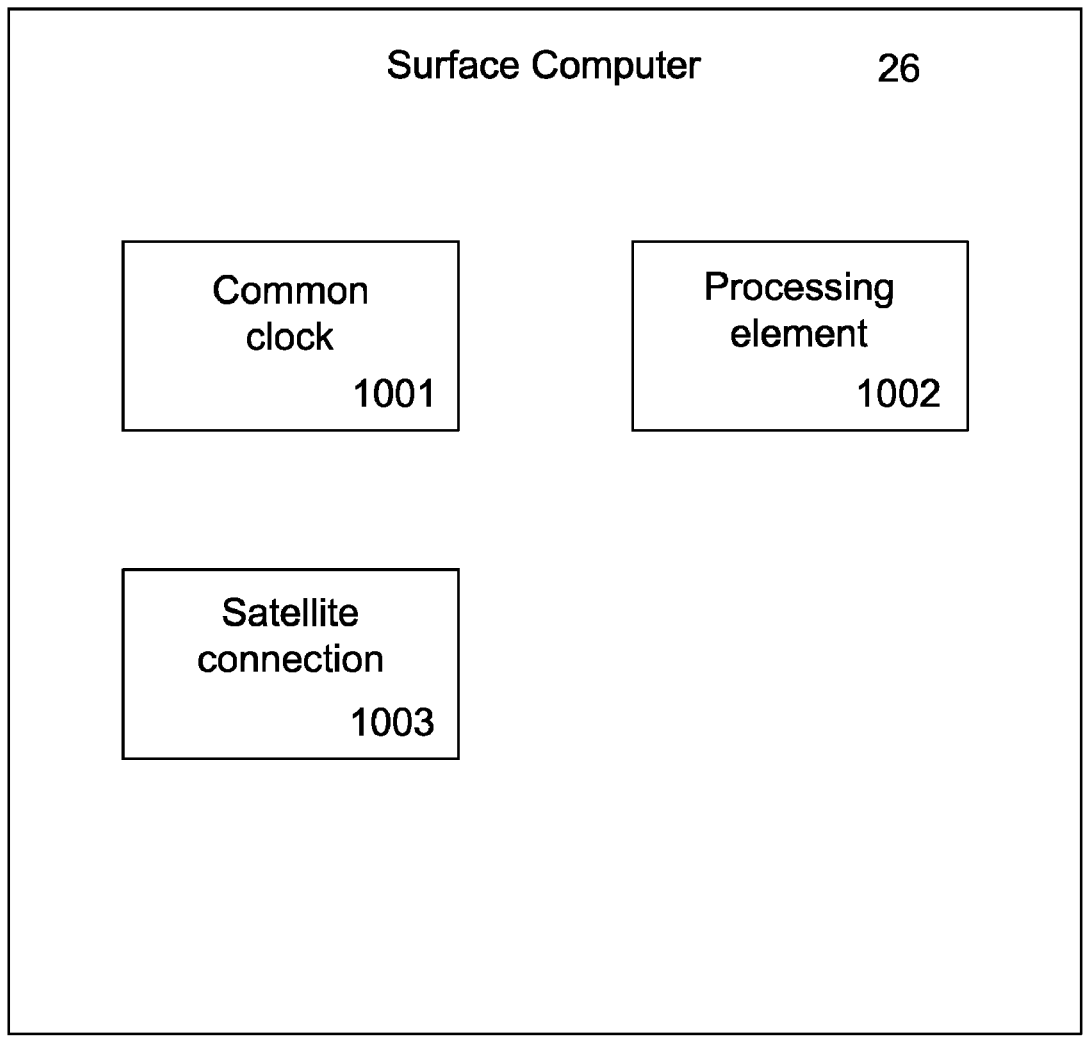
FIG. 11 is a schematic block diagram illustrating various components which may be part of a surface computer in accordance with the present invention.

A surface computer 26 may be in communication with both of the networks integrated into the first and second tool strings 200, 201. This may be accomplished via an optical cable, an electric cable or through a wireless system. The computer 26 may comprise a common clock source as shown in FIG. 11, which may be in communication with all of the clocks 88 (see FIG. 4) disposed within the nodes 18 over the downhole networks. The computer 26 may also comprise a processing element 1002 which comprises executable code adapted to synchronize the downhole clocks with the common clock. In some embodiments, the common clock is located in a satellite, a GPS, a top-hole server, or one of the nodes 18 in either of the downhole networks. Although not shown the surface computer 26 may comprise all of the hardware and be capable of all of the functions of the nodes 18 as described in reference to FIGS. 4 and 5. The surface computer may be a top-hole server which controls both the networks.

The processing element 1002 may send a synchronization pulse over the networks in such a manner that processors 31 (see FIG. 4) associated with the nodes 18 are able to synchronize to the pulses. The synchronization pulse may be sent at specific intervals or be sent on a need basis only. This pulse may be used by the downhole clocks 88 to synchronize themselves or peripheral devices such as the signal source and receiver. The processing element 1002 may also be adapted to send a signal to each of the nodes 18 (and therefore the clocks 88) and compute the time that it takes for a response signal to return. In this manner the processing element 1002 may be able to calculate the latency in the networks. In some embodiments, the downhole processing elements 31 are adapted to send a signal to the surface processing element 1001 and wait for a return signal. In either case, the downhole processing element 31 may adjust the downhole clock 88 if the clock has drifted, but the downhole processing element may also calculate the time it took a signal from the surface processing element to arrive in order to properly time stamp the arrival of the signals. Preferably, both the source and the receiver are in communication with the nodes and receive their inputs via the nodes. The arrivals of signals to the receivers are also preferably time stamped by the processing elements 31 in the node 18 as well as the activation of the signal sources.

Calculating the latency may include sending the signal to a downhole clock, waiting for a response signal to return to the processing element associated with the common clock and dividing by two. However, typically there will be some latency in the time that it takes for the downhole processing element to process a response signal. In some embodiments, there may be some other steps that add time which are associated with either processing element. Each processing element may be programmed that such steps have a consistent latency. Once the consistent processing latency is determined then it can be accounted for while synchronizing the downhole clocks with the common clock. Preferably, the step of sending a signal and measuring the time lapse is repeated and an average or medium of the measurements may be used to determine a more accurate latency. The parameters affecting latency may change over time or differ depending on the location of the downhole clocks. Temperature for example may increase as a certain downhole clock travels deeper into the well bore. Because such parameters change measurements may be taken before each cross well mapping event occurs.

The first tool string may record the signal sources' signature, time it was activated, and its intensity and send it to the processing element 1002 in the surface computer 26. The second tool string may be likewise send signal that was received, time it was received and its intensity to the surface computer 26. In some embodiments, the source and receiver may send the data to a processing element in one of the nodes in either network. Since the data were time stamped using synchronized clocks the processing element is capable of inputting the data received into the executable code adapted to create the map without having to first compensate for an unsynchronized system.

Preferably, the cross well map may be viewed in real time allowing drill teams to make real time decisions. For example, a drill string may be disposed within the intervening strata and modify its trajectory based off of the map.

Figure 12:
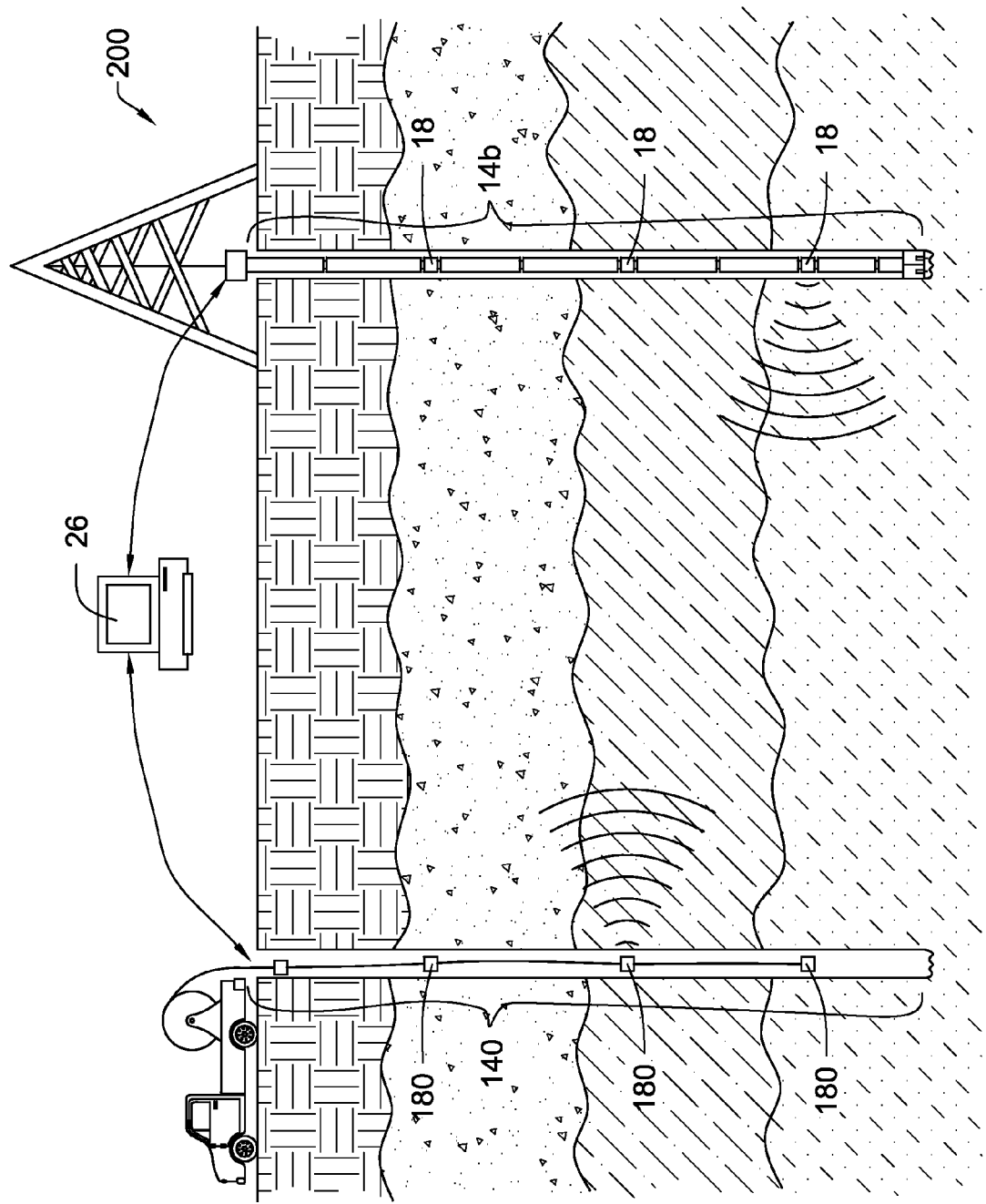
FIG. 12 is a cross sectional view of a high-speed measurement system for gathering data between two or more well or boreholes.

FIG. 12 is a cross sectional view of an embodiment of present invention. A first tool string 200 is disposed within a first well bore 203. In an adjacent well bore 204, a wire line 1400 comprising a plurality of nodes 118 forming a second network has either a downhole source or receiver associated with at least one of the nodes 118. Downhole clocks associated with the nodes of the wire line 1400 may be synchronized with the downhole clocks associated with the nodes 18 of the first tool string. In such a manner, a cross well map may be generated using at least two well bores where the cross well mapping devices are synchronized. In some embodiments coiled tubing may comprise a network and be compatible with the present invention.

Figure 13:
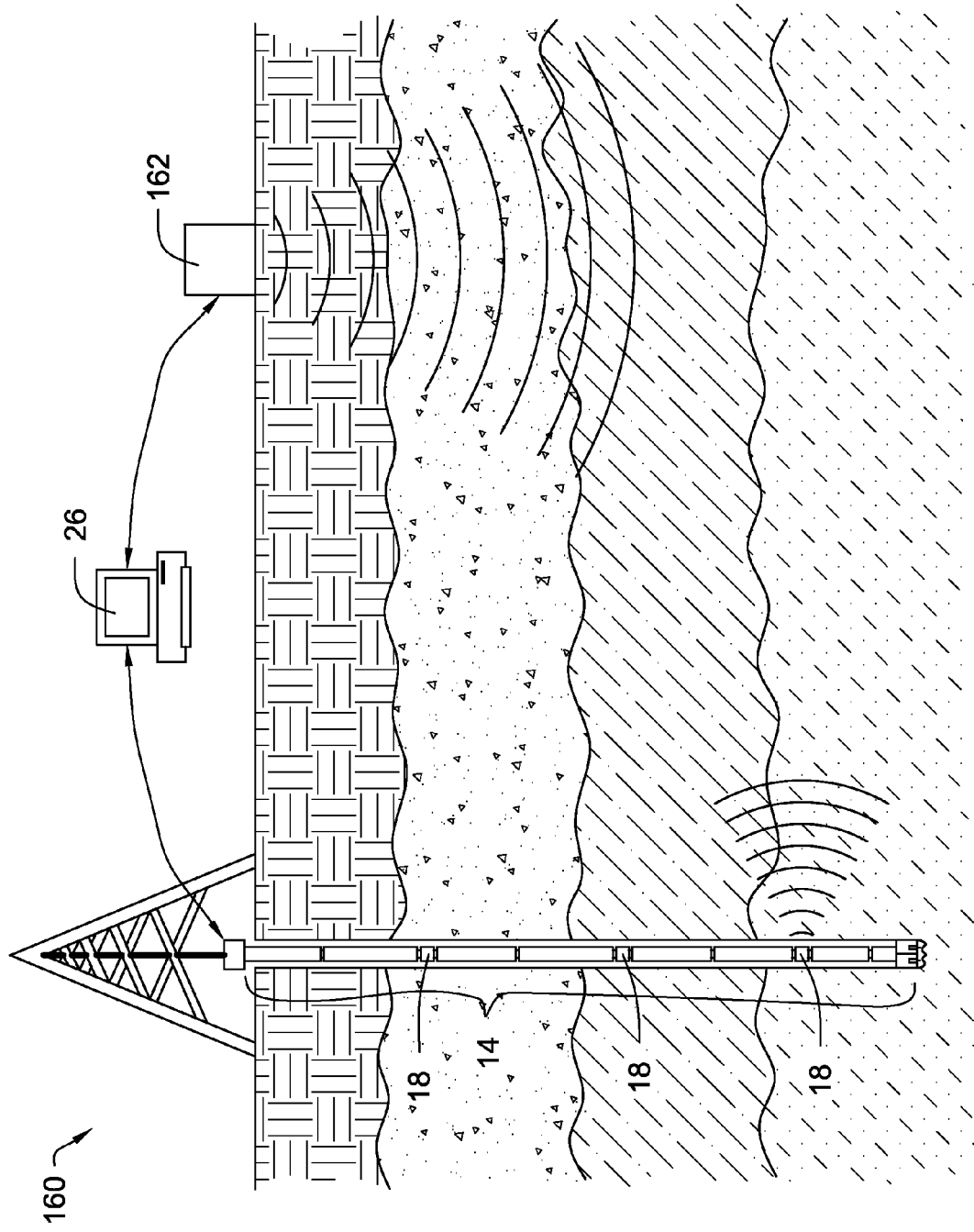
FIG. 13 is a cross-sectional view of a high-speed measurement system used to gather data from a single well or borehole.

Referring to FIG. 13, a high-speed seismic system 160 in accordance with the invention may also be used to perform single-well seismic imaging. For example, in certain embodiments, the drill string 14 may be adapted to include an array of seismic receivers operably connected to multiple nodes 18. These receivers may detect seismic waves emitted from a source 162 located at or above the surface through the intervening strata. For example, in land operations, a thumper trucks, explosives, or the like, may generate seismic waves at or above the surface. Likewise, in maritime applications, compressed air guns, explosives, or the like, may generate seismic waves underwater.

Alternatively, one or several seismic wave sources may be located downhole. These seismic wave sources may be operably connected to and/or controlled by any or all of the downhole nodes 18. Likewise, a single or array of receivers 162 may be located at or above the surface to detect and measure the seismic waves propagated through the earth.

In yet other embodiments, the high-speed seismic system 160 may include a seismic receiver and a seismic wave generator located on a single drill string 14. Seismic waves produced by the generator may reflect off of rocks and other materials located radially around the drill string 14. These waves may be detected and measured by receivers operably connected to nodes 18 located along the drill string 14. As in the other embodiments disclosed herein, the high-speed integrated nodes 18 may be effective to rapidly transmit the data gathered from these receivers to the surface while the drill string 14 is drilling or after the drill string 14 has stopped rotating.

Figure 14:
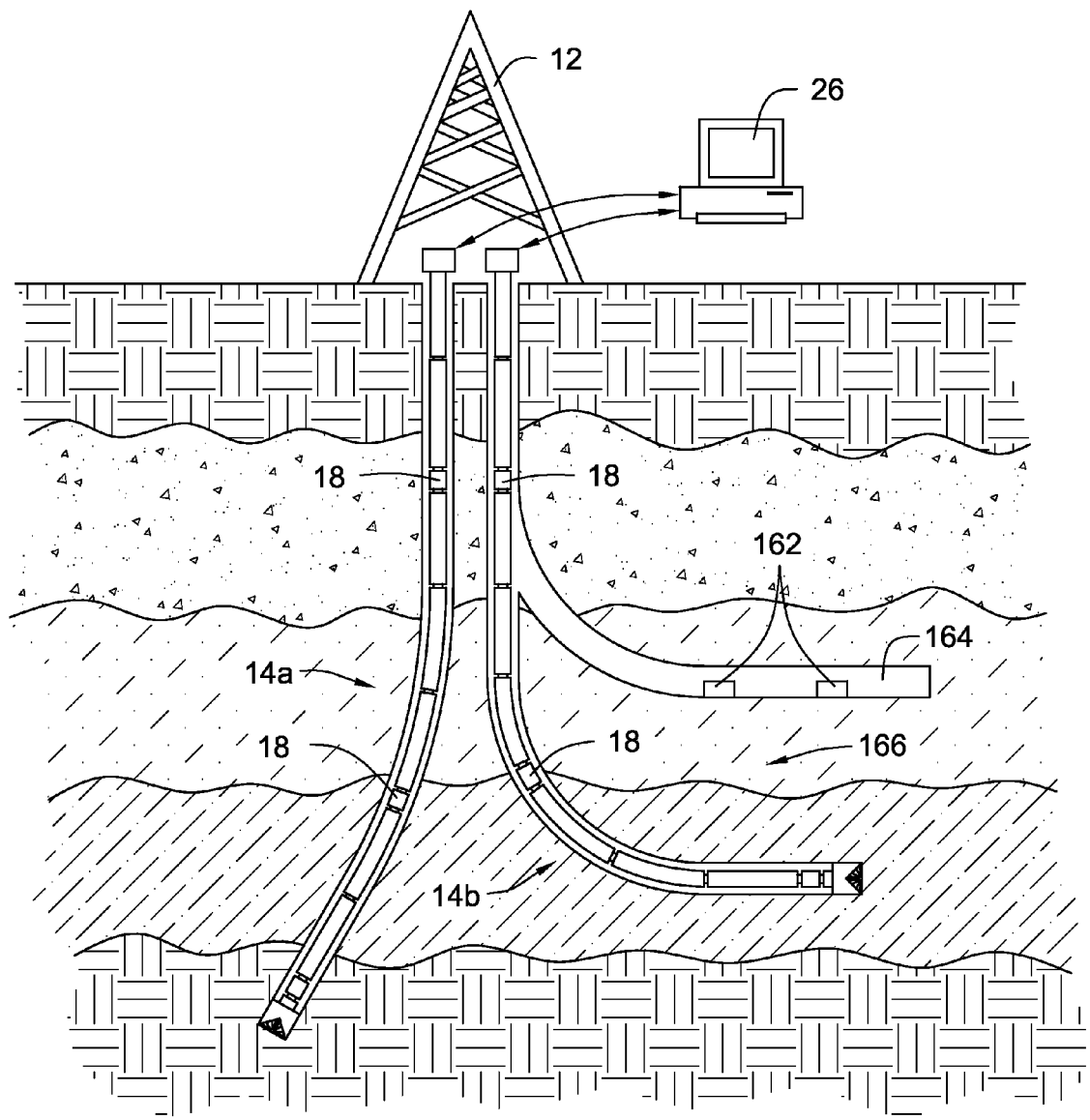
FIG. 14 is a cross-sectional view of a high-speed measurement system for gathering data between two or more wells or boreholes drilled from the same platform.

Referring to FIG. 14, in yet other embodiments, a drill rig or platform 12 may often be used to drill multiple boreholes in different locations and directions, such as is common in directional-drilling applications. As was explained in the previous examples, one or multiple drill strings 14a, 14b may be equipped with a high-speed seismic measurement system in accordance with the present invention. Each drill string 14a, 14b, may be equipped with seismic receivers, seismic wave generators, or a combination thereof. These seismic devices may be used to take single-well seismic measurements in a radial direction around a drill string 14a, or may be used to perform cross-well measurements between multiple drill strings 14a, 14b. In other embodiments, seismic devices 162, such as receivers or sources may be placed in boreholes 164 where a drill string has previously kicked off. These devices 162 may work in coordination with various seismic devices located on a drill string 14b to map the intervening strata 166.

Figure 15:
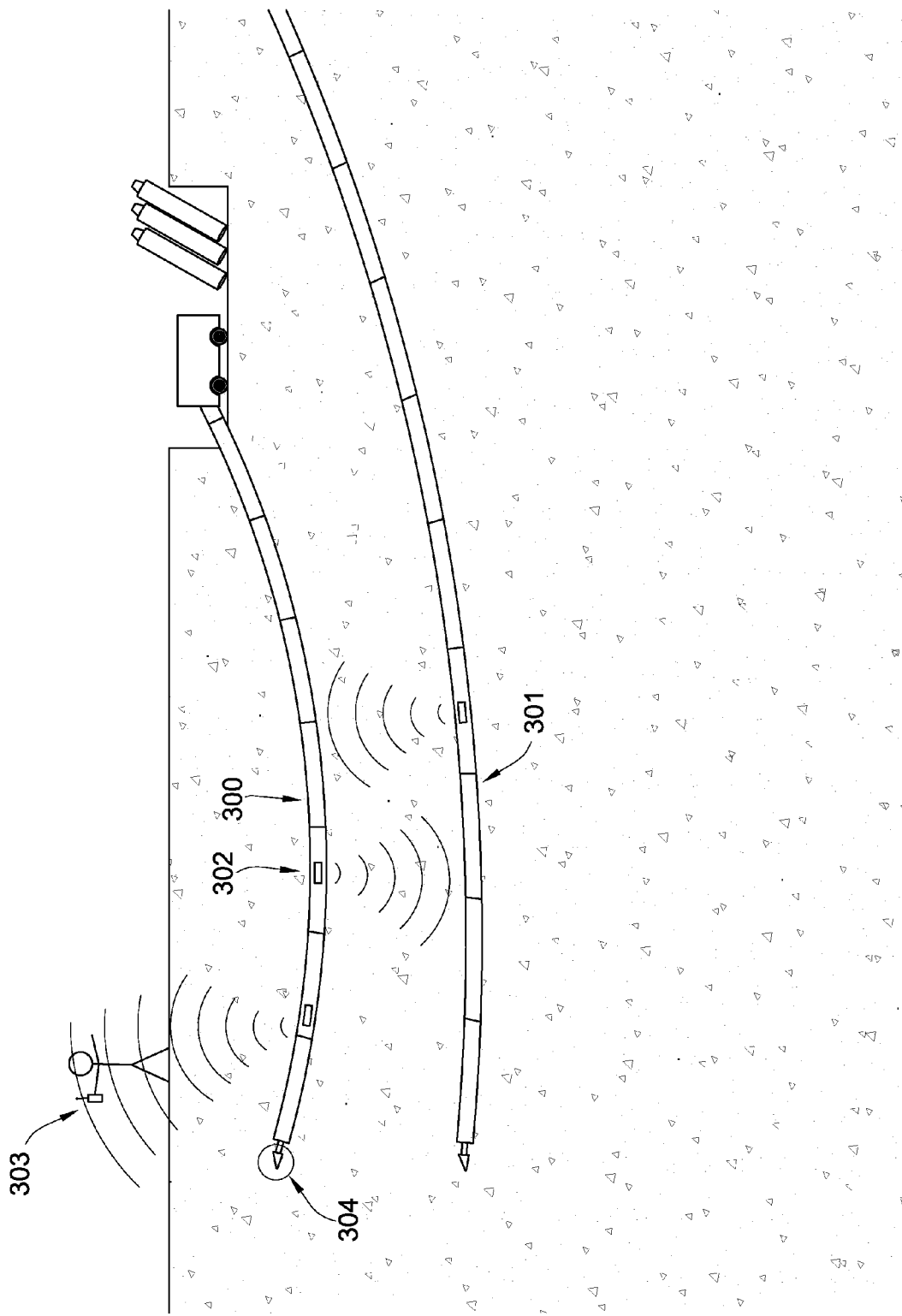
FIG. 15 is a cross sectional view of a high-speed measurement system for gathering data between horizontal downhole tool strings.
Figure 16:
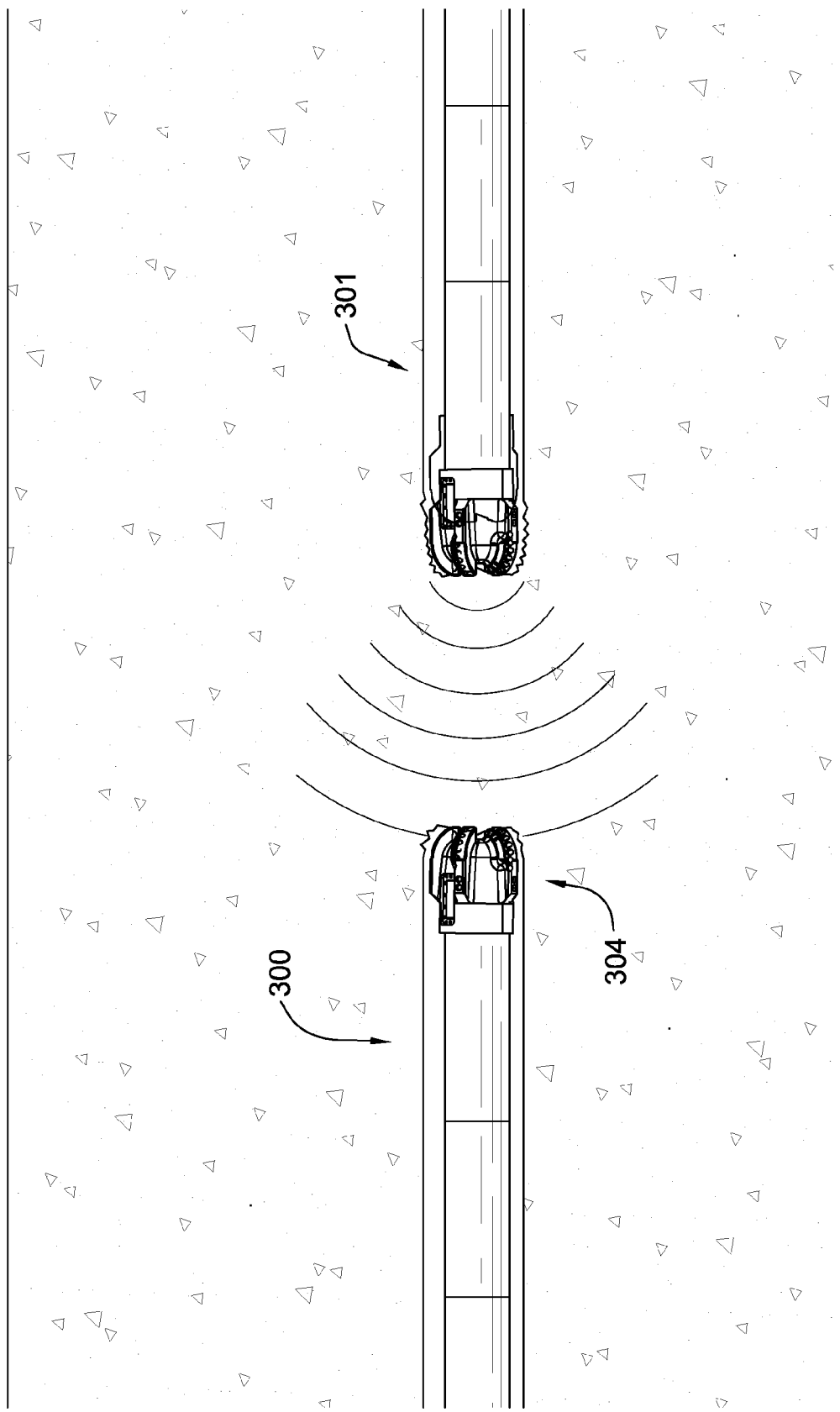
FIG. 16 is a cross sectional view of another embodiment of a high-speed measurement system for gathering data between horizontal downhole tool strings.

FIG. 15 is a cross sectional view of an embodiment of gathering data between at least two horizontally positioned downhole tool strings 300, 301. Each tool string comprises a network with either a signal source 302 or a signal receiver or a combination thereof. Horizontal drilling may be used to access a natural resource such as a hydrocarbon, water, mineral or combinations thereof. In other embodiments, horizontal drilling may be used to bury utility lines or form tunnels. The drill bit 304 may comprise PCD cutters and/or may be adapted to rotary steer or geo-steer around obstacles in the underground formation. In some embodiments, the surface receiver 303 or source may be used to communicate with the tool strings and/or create cross well maps. FIG. 16 discloses another embodiment of horizontally drilling where at least two downhole tool strings 300, 301 are approaching each other from opposing directions.

Figure 17:
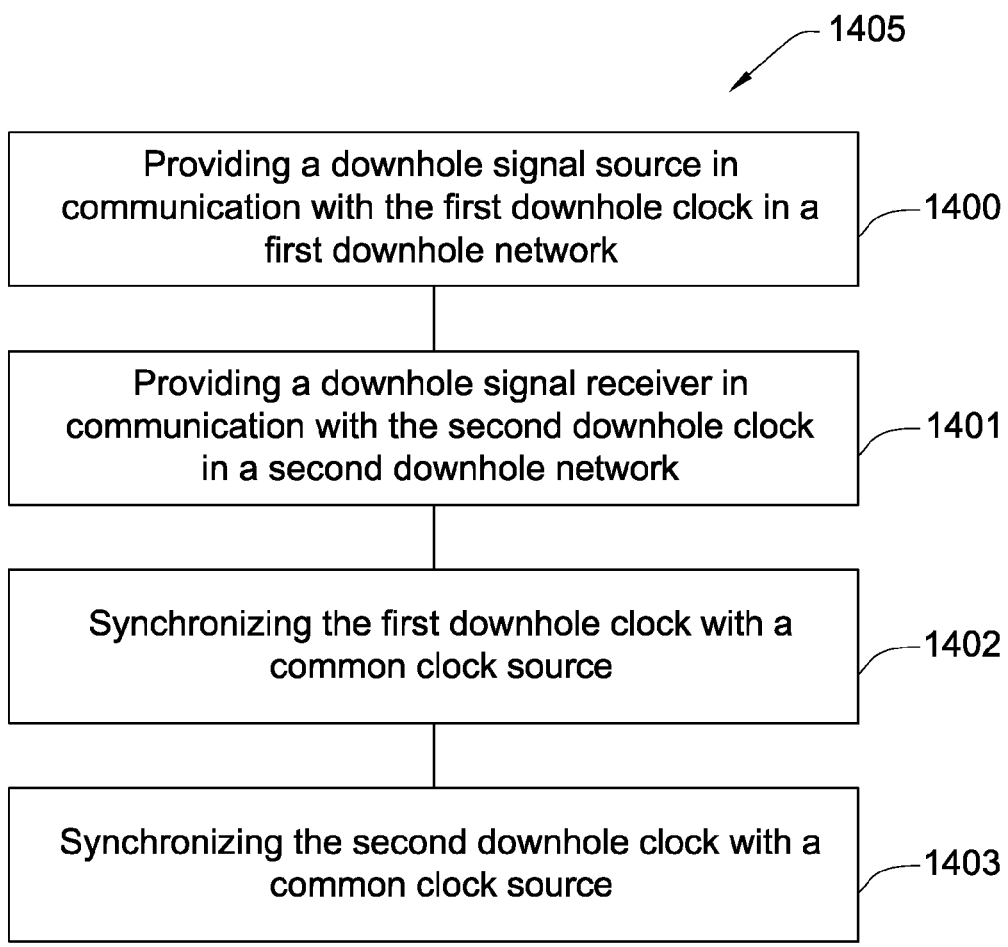
FIG. 17 is a view of an embodiment of a method for making a cross well map in accordance with the present invention.

FIG. 17 is a diagram of a method 1405 for making a cross well measurement comprising the steps of providing 1400 a downhole signal source in communication with a first network integrated into a first tool string; providing 1401 a downhole signal receiver in communication with a second network integrated into a second tool string; the source being in communication with a first downhole clock in the first downhole network and the receiver being in communication with a second downhole clock in the second downhole network; synchronizing 1402 the first clock with a common clock source in communication with both the first and second clock; and synchronizing 1403 the second clock with the common clock source. In some embodiments, the method 1405 also includes a step of time stamping the activation of the source and time stamping the arrival of the signal at the receiver.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. A high-speed measurement system, the system comprising:

a first and second well bore;

a first and second plurality of network nodes integrated into and spaced at intervals along the first and second well bores, respectively;

a communication channel connecting each plurality of network nodes forming a first and second downhole network;

a signal source in communication with the first downhole network and a signal receiver in communication with the second downhole network; and a common clock source in communication with both the signal source and the signal receiver over the first and second downhole networks respectively;

wherein the signal source and signal receiver are synchronized with the common clock source over the downhole networks, the signal source is adapted to send a signal to the signal receiver through a subterranean formation and at least one of the downhole networks is integrated into a downhole tool string;

wherein each of the nodes comprises a downhole clock; and wherein the source and reciever are in communication with at least one of the downhole clocks;

wherein the communication channel in at least one of the tool strings comprises a plurality of segments, each segment terminating proximate the ends of each tool string component wherein the segments are electrically insulated from one another, but are in magnetic communication via inductive couplers wherein the inductive couplers comprises a coil disposed within a trough of magnetically conductive electrically insulating material.

2. The system of claim 1, wherein the source is an acoustic source, an induction source, an electric source, a nuclear source or combinations thereof.

3. The system of claim 2, wherein the acoustic source is a seismic source, a sonic source, an explosive, a compressed gun, a vibrator, a sparker, or combinations thereof.

4. The system of claim 1, wherein the at least one tool string is a drill string, a production string, an injection string, casing string, or combinations thereof.

5. The system of claim 1, wherein the source and the receiver and are used to create a cross-well map.

6. The system of claim 1, wherein the common clock source is a disposed within a node of either the first or second plurality of nodes, a GPS, a server, surface equipment, a satellite, or combinations thereof.

7. The system of claim 1, wherein a processing element is in electrical communication with the common clock and the downhole clocks.

8. The system of claim 7, wherein the processing element is adapted to process the latency between the common clock and at least one downhole clock.

9. The system of claim 1, wherein the processing element is adapted to send a synchronization pulse over at least one of the networks.

10. The system of claim 9, wherein at least one downhole clock is in communication with a downhole processing element adapted to synchronize the downhole clock with the synchronization pulse.

11. The system of claim 1, wherein the first and second networks are controlled by a common server.

* * * * *